(12) United States Patent
Okinaka et al.

(10) Patent No.: US 6,391,450 B1
(45) Date of Patent: May 21, 2002

(54) SPINDLE-SHAPED GOETHITE PARTICLES, SPINDLE-SHAPED HEMATITE PARTICLES, SPINDLE-SHAPED MAGNETIC IRON-BASED ALLOY PARTICLES, AND PROCESS FOR PRODUCING THE SAME

(75) Inventors: Kenji Okinaka; Masayuki Uegami, both of Yamaguchi-ken (JP)

(73) Assignee: Toda Kogyo Corporation, Hiroshima (JP)

( * ) Notice: Subject to any disclaimer, the term of this patent is extended or adjusted under 35 U.S.C. 154(b) by 0 days.

(21) Appl. No.: 09/573,183

(22) Filed: May 19, 2000

(30) Foreign Application Priority Data

May 20, 1999 (JP) .............................. 11-139858
Mar. 16, 2000 (JP) ....................................... 2000-073471

(51) Int. Cl.$^7$ ................................................. G11B 5/66
(52) U.S. Cl. ................ 428/402; 428/403; 428/694 BA; 428/900; 420/80; 420/83; 420/103; 420/252; 420/62.56; 420/148; 420/311; 420/301; 420/331
(58) Field of Search ................................ 428/402, 403, 428/694 BA, 900; 420/80, 83, 103; 252/62, 56; 148/311, 301, 331

(56) References Cited

U.S. PATENT DOCUMENTS

| | | | |
|---|---|---|---|
| 5,698,311 A | 12/1997 | Masaki et al. ............... | 428/328 |
| 5,962,125 A | 10/1999 | Masaki ........................ | 428/328 |
| 6,048,412 A | * 4/2000 | Kunokawa ................... | 148/311 |

FOREIGN PATENT DOCUMENTS

| | | |
|---|---|---|
| EP | 0 717 397 A2 | 6/1996 |
| EP | 0 768 644 A1 | 4/1997 |
| EP | 0 928 775 A2 | 7/1999 |
| EP | 0 940 369 A2 | 9/1999 |
| EP | 0 999 185 A1 | 5/2000 |
| JP | 10245233 | 9/1998 |
| JP | 11011951 | 1/1999 |

OTHER PUBLICATIONS

European Search Report dated Aug. 10, 2000.

* cited by examiner

*Primary Examiner*—Leszek Kiliman
(74) *Attorney, Agent, or Firm*—Armstrong, Westerman & Hattori, LLP

(57) ABSTRACT

Spindle-shaped goethite particles are disclosed, which contain not less than 0.5 and less than 8 atom % of Co based on the total Fe and 5 to 10 atom % of Al based on the total Fe, and have an average major axis diameter of 0.18 to 0.30 μm, a size distribution (standard deviation/major axis diameter) of not more than 0.22, an average minor axis diameter of 0.025 to 0.045 μm and an average aspect ratio is 5 to 10. Spindle-shaped hematite particles and spindle-shaped magnetic iron-based alloy particles are also disclosed, which are produced from the above goethite particles. The spindle-shaped goethite particles of the present invention provide spindle-shaped magnetic iron-based alloy particles which are excellent in dispersibility (high squareness and high orientation), excellent both in weatherability and in coercive force distribution, and are useful as household DAT, 8 mm, Hi-8 tapes, VTR tapes for business purposes, computer tapes or floppy disks.

25 Claims, 5 Drawing Sheets

SPINDLE-SHAPED GOETHITE PARTICLES, SPINDLE-SHAPED HEMATITE PARTICLES, SPINDLE-SHAPED MAGNETIC IRON-BASED ALLOY PARTICLES, AND PROCESS FOR PRODUCING THE SAME

BACKGROUND OF THE INVENTION

1. Field of the Invention

The present invention relates to spindle-shaped magnetic goethite particles and spindle-shaped hematite particles, which have a uniform particle size, a larger minor axis diameter and a suitable aspect ratio and are very excellent in sintering preventing performance, and to spindle-shaped magnetic iron-based alloy particles which are obtained from said spindle-shaped hematite particles as a starting material, are excellent in dispersibility (high squareness and high orientation), excellent both in weatherability and in coercive force distribution and are preferably usable as household DAT, 8 mm, Hi-8 tapes, VTR tapes for business purposes, computer tapes or floppy disks.

2. Description of the Prior Art

Miniaturized and lightweight magnetic recording and reproducing devices for long-time recording in audios, videos and computers such as household DAT, 8-mm video tapes, Hi-8 tapes, VTR tapes for business purposes, computer tapes or floppy disks have recently shown a remarkable progress. Especially, video tape recorders (VTR) have rapidly spread widely and the development of miniaturized and lighter-weight VTR for longer-time recording, particularly attempted shifting from analogue to digital systems, has been rapid. With this development, magnetic recording media such as a magnetic tape have been strongly required to have a higher performance and a higher recording density and to improve reliability in recording.

Magnetic recording media are required to improve higher picture qualities, higher output characteristics and especially frequency characteristics, and for this purpose, it is necessary to improve the residual flux density (Br), the coercive force, the dispersibility, the packing property, the surface smoothness of a magnetic tape and the S/N ratio.

These properties of magnetic recording media have a close relationship with the magnetic particles used for the magnetic recording media. In recent years, magnetic iron-based alloy particles have attracted attention due to their coercive force and saturation magnetization which are superior to those of conventional iron oxide magnetic particles, and have been put to practical use as magnetic recording media such as digital audio tapes (DAT), 8-mm video tapes, Hi-8 tapes, VTR tapes for business purposes, computer tapes and floppy disks. Such magnetic iron-based alloy particles, however, are also strongly demanded to improve the properties.

The properties of magnetic recording media are described in detail as follows: In order to achieve high picture qualities as video magnetic recording media, it is required to improve SIN ratio and video frequency characteristics. For this improvement, it is important to improve the dispersibility of magnetic particles in a coating material, orientation in a coating film and the packing property and to improve the surface smoothness of the magnetic recording media. In order to improve the video frequency characteristics, it is necessary that the coercive force of the magnetic recording media is not only high, but the residual flux density is large, and further that the S.F.D. (Switching Field Distribution) of the magnetic recording media, namely, the coercive force distribution is small. In addition, the repeated running ability, still characteristics or reliability of the magnetic recording media in recording for use in a severe environment should also be secured, in other words, the improvement of durability is also important.

It is considered that such metal magnetic particles preferably have a larger particle size for the dispersibility and weatherability thereof, and preferably have a larger aspect ratio for the squareness and orientation thereof in the form of a coating film. On the other hand, those having a smaller particle size are preferable from the viewpoint of surface smoothness and noises, but as the particle size is decreased, the particles are hardly dispersed and their weatherability is deteriorated. From the viewpoint of saturation magnetization, those having a larger particle size with an excellent distribution of particle sizes are preferable, but if the particle size is larger than necessary, the coercive force tends to be reduced, and it is thus necessary to maintain the coercive force by increasing the aspect ratio of the metal magnetic particles.

Generally, for preparation of the metal magnetic particles, goethite particles as the starting material, hematite particles obtained by heat dehydrating the goethite particles, or particles prepared by adding heterogeneous non-iron metals to these particles are heat-treated, if necessary, in a non-reducing atmosphere and then heat-reduced in a reducing atmosphere to form metal magnetic particles. During this process, it is necessary to suitably regulate the shape and size of goethite particles as the starting material and to prevent the fusion of particles upon heat treatment such as heating and reduction or the deformation and destruction of a single particle, whereby the shape and size of goethite particles as the starting material are maintained and inherited by the resulting metal magnetic particles.

Morphologically, there are two kinds of goethite particles as the starting material, that is, needle-shaped goethite particles obtained from an alkali hydroxide as a base and spindle-shaped goethite particles obtained from an alkali carbonate as a base. Although the needle-shape goethite particles are characterized in that generally those having a larger aspect ratio can be easily obtained, there is the problem that they are inferior to spindle-shaped particles in particle size distribution and those having a small particle size are hardly obtained. This particle size distribution is an indicator of the uniformity of primary particles and is thus also closely related to the coercive force distribution of the metal magnetic particles or to their weatherability, that is, oxidation stability. Japanese Patent Application Laid-Open (KOKAI) No. 5-98321 discloses the technique of obtaining fine needle-shaped particles having a relatively large aspect ratio, a high coercive force and a large saturation magnetization, but the oxidation stability and heat resistance of the metal magnetic particles or the weatherability of magnetic coating film therefrom have not sufficiently been examined.

On the other hand, the spindle-shaped goethite particles are characterized by being generally superior in particle size distribution of, but those having a larger aspect ratio are hardly obtained, and if the particle size is increased, the coercive force of the metal magnetic particles is low as compared with the needle-shaped particles, and thus the coercive force is maintained usually by decreasing the particle size. As a result, since the particle size is relatively small, there is the problem that the dispersibility thereof in a coating material is not good, and further due to the low aspect ratio, the squareness and orientation of the coating film are low, and the weatherability of the coating film is not satisfactory due to the small particle size in spite of good particle size distribution. Japanese Patent Application Laid-Open (KOKAI) No. 5-62166 discloses the technique of securing the coercive force and improving the dispersibility on the basis of the idea of enlarging the aspect ratio of spindle-shaped metal magnetic particles, but the oxidation stability of the metal magnetic particles and the weatherability of magnetic coating film therefrom are not taken into consideration.

For the reason described above, metal magnetic particles used in media for magnetic recording and reproducing devices in audios, videos and computers such as household DAT, 8-mm video tapes, Hi-8 tapes, VTR tapes for business purposed, computer tapes or floppy disks generally make use of needle-shaped metal magnetic particles with a coercive force of 103.5 to 143.2 KA/m (1300 to 1800 Oe) having a large particle size, a large aspect ratio, and a high squareness and orientation thereof in a magnetic coating film. However, these particles are not satisfactory in respect of the particle size distribution as described above, and an attempt of improving this feature is being conducted, but because of a relatively broad particle size distribution as compared with that of spindle-shaped particles, the weatherability thereof cannot be satisfactory regardless of their large particle sizes.

As the heat reduction apparatus used in the heat reduction step, there are known a fluidized-bed reduction apparatus for heat reducing the starting material while fluidizing it in a powdery forms a fixed-bed reduction apparatus for heat reducing the starting material after granulating and forming it into a fixed bed, and a transfer-bed reduction apparatus for transferring a bed having a fixed bed formed therein.

In raising a demand for mass-production technology accompanied with an increasing demand for metal magnetic particles, an apparatus (including a transfer bed) provided with a fixed bed enabling mass-production which are free of particle scattering regardless of a larger flow of a reducing gas such as hydrogen, etc. is industrially and economically advantageous.

However, if heat reduction is conducted under a hydrogen gas atmosphere by forming a fixed bed, the partial pressure of steam is increased by rapid reduction in a lower part of the fixed bed, and the destruction of the shape of particles and the excessive growth of the minor axis occur in an upper part of the bed as compared with the lower part of the bed, thus easily causing a difference in the characteristics of particles between the lower and upper parts of the bed, and it is difficult to obtain metal magnetic particles having uniform characteristics.

Generally, it is necessary that the fusion of particles as the starting material or the deformation or destruction of a single particle is prevented so that the shape and size of the goethite particles as the starting material or hematite particles are maintained and inherited by the resulting metal magnetic particles. The metal magnetic particles whose shape was destroyed cannot achieve a high coercive force due to a reduction in shape anisotropy and the particle size distribution is lowered. Further, even in production of magnetic recording media, due to an increase in the force between particles in the step of kneading and dispersing them in a binder resin or due to an increase in the magnetic cohesion, the dispersibility of the particles is lowered and the squareness thereof in a magnetic coating film is lowered, and thus magnetic recording media having excellent SFD cannot be obtained.

Accordingly, there is a strong demand for a heat reduction method by which the destruction of particle shape is prevented as much as possible and simultaneously the characteristics of metal magnetic particles in lower and upper parts of a fixed bed are made uniform.

As the method of obtaining magnetic iron-based alloy particles having uniform characteristics and high coercive force by forming a fixed bed, there are known a method in which needle-shaped magnetite is obtained by reduction at a temperature of less than 350° C. while specific steam is introduced at an initial stage of reduction, followed by reduction in the temperature range of 350 to 550° C. (Japanese Patent Application Laid-Open (KOKAI) No. 4-224609), a method of heat reduction in which a gas superficial velocity of a hydrogen gas is adjusted in a specific range (Japanese Patent Application Laid-Open (KOKAI) No. 54-62915) and a method in which a material to be reduced is transferred continuously to a belt capable of passing a gas and provided in a gas passaging reactor, and the material is heat-reduced while a hydrogen gas is passed in a vertical direction (Japanese Patent Application Laid-Open (KOKAI) No. 6-93312).

Under the background described above, it is required to produce metal magnetic particles having uniform characteristics by use of an apparatus having a fixed bed formed therein, which are spindle-shaped particles being excellent in dispersibility (high squareness, high orientation) and excellent both in weatherability and in coercive force distribution and having a coercive force of preferably 103.5 to 143.2 KA/m (1300 to 1800 Oe).

Conventionally, with respect to the spindle-shaped goethite and spindle-shaped metal magnetic particles, Japanese Patent Publication (KOKOKU) No. 1-18961 discloses the technique in which the desired coercive force is obtained by selecting the particle size and aspect ratio suitably and the specific surface area is reduced to decrease the viscosity thereof in a coating material, but the oxidation stability of the metal magnetic particles and the squareness and orientation thereof in a coating film are not taken into consideration.

With the idea of increasing the aspect ratio as is the case with the conventional needle-shaped metal magnetic particles, Japanese Patent Application Laid-Open (KOKAI) Nos. 9-295814 and 10-245233 disclose the techniques of achieving a high coercive force and an excellent coercive force distribution in the spindle-shaped metal magnetic particles, but the oxidation stability is not taken into consideration. Japanese Patent Application Laid-Open (KOKAI) No. 10-245233 supra describes that the coercive force distribution thereof in a coating film is excellent where the relationship between the crystallite sizes D104 and D110 of spindle-shaped hematite particles is in a specific range, but the relationship with the crystallite size of goethite particles as the starting material is not referred to, and this prior art is unsatisfactory in respect of the sintering of particles in the heat treatment step or in the destruction of the shape of particles.

Japanese Patent Application Laid-Open (KOKAI) Nos. 7-126704, 8-165501 and 8-165117 disclose the techniques of obtaining fine spindle-shaped metal magnetic particles with a high coercive force containing Co and Al, but the oxidation stability of the metal magnetic particles is not sufficiently examined in Japanese Patent Application Laid-Open (KOKAI) No. 7-126704 and the level in Japanese Patent Application Laid-Open (KOKAI) No. 8-165501 is not satisfactory. In Japanese Patent Application Laid-Open (KOKAI) No. 8-165117, the crystallite size ratio D020/D110 of spindle-shaped goethite particles is specified, but the growth for formation of surface layer particles from seed crystal particles is not mentioned.

With respect to the heat resistance of metal magnetic particles, Japanese Patent Application Laid-Open (KOKAI) No. 59-207024 discloses metal magnetic particles whose differential thermal curve is not changed until 80° C., and describes those containing 7 atom % of Al with an ignition temperature of 130° C. though their shape is not revealed. Similarly, in Japanese Patent Application Laid-Open (KOKAI) No. 2-19161, even those having a high ignition temperature of 121° C. at highest and their heat resistance is not satisfactory.

Japanese Patent Application Laid-Open (KOKAI) No. 10-334455 discloses the technique of obtaining magnetic recording media having excellent head sliding characteristics and good storage properties by adjusting the contents of Co, Al and rare earth elements in metal magnetic particles within a specific range, but the particle size, shape, and particle size distribution of goethite particles as the starting material are not examined, and the coercive force, weatherability and dispersibility are not sufficiently examined.

For the spindle-shaped goethite particles described above, while maintaining their excellent particle size distribution, including the above problem, that is, maintaining the coercive force in a state where the particle size is enlarged, the enlargement of the aspect ratio is examined on the basis of the same idea as for needle-shaped metal magnetic particles in order to obtain a high squareness and high orientation of the spindle-shaped particles, but satisfactory particles have not been obtained yet, and it cannot be said that the effect or influence on individual characteristics are sufficiently examined.

In the method described in Japanese Patent Application Laid-Open (KOKAI) No. 4-224609 supra, the atmosphere for heating is hydrogen, but the heating rate is not specified, and it cannot be said that oxidation stability etc. are sufficiently examined.

Further, in the method described in Japanese Patent Application Laid-Open (KOKAI) No. 54-62915 supra, the coercive force of the resulting metal magnetic particle powder is as low as 95.5 KA/m (1200 Oe), probably because the atmosphere for heating is nitrogen and the superficial velocity for a reducing gas is low, and further it cannot be said that the dispersibility thereof in a coating material and the squareness and orientation thereof in a coating film are sufficiently examined.

Further, in the method described in Japanese Patent Application Laid-Open (KOKAI) No. 6-93312 supra, the magnetic particles does not contain Co, and it cannot be said that the oxidation stability of the magnetic particles, the dispersibility thereof in a coating material and the squareness and orientation thereof in a coating film are sufficiently examined.

SUMMARY OF THE INVENTION

An object of the present invention is to provide metal magnetic particles having a high coercive force of e.g. 103.5 to 143.2 KA/m (1300 to 1800 Oe), which are spindle-shaped, and excellent in dispersibility (high squareness, high orientation) and has both excellent weatherability and coercive force distribution.

Another object of the present invention is to provide metal magnetic particles having uniform characteristics in lower and upper parts of a formed fixed bed.

Still other objects and advantages of the present invention will be evident to those skilled in the art from the following description.

As a result of their extensive study on obtaining spindle-shaped metal magnetic particles characterized by excellent particle size distribution, which are further endowed with the characteristics of needle-shaped metal magnetic particles, that is, the high dispersibility, high squareness and high orientation thereof in a coating film and with further excellent particle size distribution, the present inventors achieved these objects by an idea completely different from the conventional idea and succeeded in providing metal magnetic particles with further improved above-described characteristics in a bed comprising a fixed bed formed therein, thereby arriving at the present invention.

DETAILED DESCRIPTION OF THE INVENTION

Figure 1:
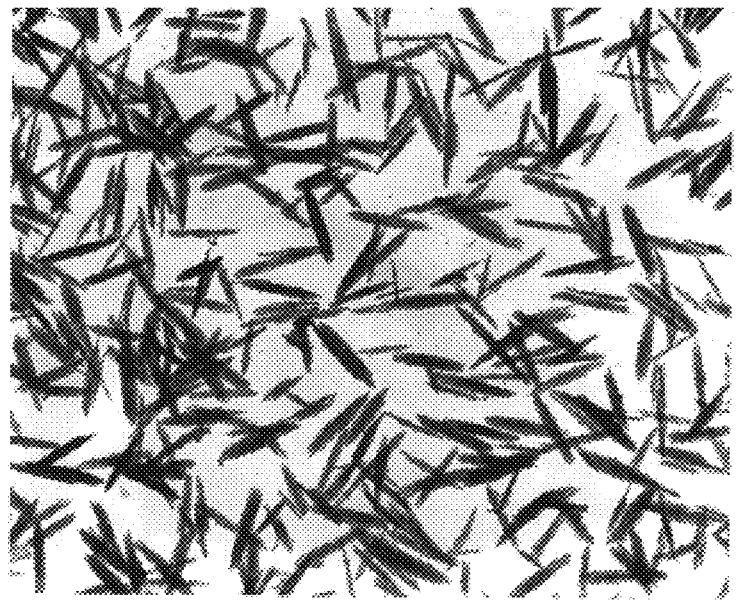
FIG. 1 is a transmission electron micrograph (×30000) of the particle structure of the spindle-shaped goethite particles obtained in the Embodiment 1.

In a first aspect of the present invention, there are provided spindle-shaped goethite particles containing not less than 0.5 and less than 8 atom % of Co based on the total Fe and 5 to 10 atom % of Al based on the total Fe and having an average major axis diameter of 0.18 to 0.30 μm, wherein a size distribution (standard deviation/major axis diameter) is not more than 0.22, an average minor axis diameter is 0.025 to 0.045 μm and an average aspect ratio is 5 to 10.

In a second aspect of the present invention, there are provided spindle-shaped hematite particles containing not less than 0.5 and less than 10 atom % of Co based on the total Fe, 5 to 10 atom % of Al based on the total Fe and 1 to 5 atom % of a rare earth element based on the total Fe with a ratio of Al/rare earth element of 1.5 to 5 (atom % based on the Fe) and having an average major axis diameter of 0.17 to 0.28 μm, wherein a size distribution (standard deviation/major axis diameter) is not more than 0.20, an average minor axis diameter is 0.022 to 0.035 μm, an average aspect ratio is 5 to 10, and a crystallite size ratio D110/D104 is 2.0 to 4.0.

In a third aspect of the present invention, there are provided spindle-shaped magnetic iron-based alloy particles containing not less than 0.5 and less than 10 atom % of Co based on the total Fe, 5 to 10 atom % of Al based on the total Fe and 1 to 5 atom % of a rare earth element based on the total Fe with a ratio of Al/rare earth element of 1.5 to 5 (atom % based on the Fe) and having an average major axis diameter of 0.15 to 0.25 μm, wherein a size distribution (standard deviation/major axis diameter) is not more than 0.30, an average minor axis diameter is 0.015 to 0.025 μm, an average aspect ratio is 5 to 9, an ignition temperature is not lower than 135° C., an oxidation stability is not more than 10%, and a coercive force is 103.5 to 143.2 KA/m (1300 to 1800 Oe).

In a fourth aspect of the present invention, there is provided the spindle-shaped magnetic iron-based-alloy particles containing not less than 0.5 and less than 10 atom % of Co based on the total Fe, 5 to 10 atom % of Al based on the total Fe and 1 to 5 atom % of a rare earth element based on the total Fe with a ratio of Al/rare earth element of 1.5 to 5 (atom % based on the Fe) and having an average major axis diameter of 0.15 to 0.25 μm, wherein a size distribution (standard deviation/major axis diameter) is not more than 0.26, an average minor axis diameter is 0.015 to 0.025 μm, an average aspect ratio is 5 to 9, an ignition temperature is not lower than 145° C., an oxidation stability is not more than 6%, and a coercive force is 103.5 to 143.2 KA/m (1300 to 1800 Oe).

In a fifth aspect of the present invention, there is provided a process for producing spindle-shaped goethite particles, which comprises the steps of:

aging an aqueous suspension containing ferrous iron-containing precipitates obtained by reacting an aqueous alkali mixture comprising of an alkali carbonate aqueous solution and an alkali hydroxide aqueous solution with a ferrous salt aqueous solution in a nonoxidizing atmosphere, passing an oxygen-containing gas through the aqueous suspension to form spindle-shaped goethite seed crystal particles by oxidation reaction, passing an oxygen-containing gas through the aqueous suspension containing the seed crystal particles and the ferrous iron-containing precipitates to allow a goethite layer to grow by oxidation reaction on the surface of the seed crystal particles to form spindle-shaped goethite particles, an improvement of which comprises adding a Co compound containing not less than 0.5 and less than 8 atom % of Co based on the total Fe, at a stage within ½ of the total aging time, to the aqueous suspension of aging ferrous iron-containing precipitates before initiation of oxidation reaction, conducting oxidation reaction within the range of 40 to 50% of the total $Fe^{2+}$, and adding an Al compound containing 5 to 10 atom % of Al based on the total Fe.

In a sixth aspect of the present invention, there is provided a a process for producing spindle-shaped hematite particles, which comprises the steps of:

treating the spindle-shaped goethite particles described above with a sintering preventing agent comprising a compound of rare earth elements containing 1 to 5 atom % of a rare earth element based on the total Fe such that the ratio of Al/rare earth element is 1.5 to 5 (atom % based on Fe), and heat treating the treated spindle-shaped goethite particles at 650 to 800° C. in a non-reducing atmosphere such that the crystallite size D104 is in the range of 0.9 to 1.1 as D104/goethite D110.

In a seventh aspect of the present invention, there is provided a process for producing spindle-shaped magnetic iron-based alloy particles, which comprises heat reducing the spindle-shaped hematite particles described above at 400 to 700° C. in a reducing atmosphere, First, the spindle-shaped goethite particles according to the present invention are described.

The particles constituting the spindle-shaped goethite particles according to the present invention have an average major axis diameter of 0.18 to 0.30 μm and a size distribution (standard deviation/average major axis diameter) is not more than 0.22. Further, the average minor axis diameter is 0.025 to 0.045 μm. The particles are spindle-shaped with an average aspect ratio (major axis diameter/minor axis diameter) of 5 to 10. If the average major axis diameter is less than 0.18 μm, the coercive force of the resulting metal magnetic particles becomes too high, and the dispersibility thereof in a coating material is deteriorated, and the weatherability of their coating film is easily deteriorated. On the other hand, if it exceeds 0.30 μm, the desired coercive force is hardly obtained in the range of the aspect ratio of the present invention. Further, since the size distribution thereof in a lower range is better, the lower limit is not particularly limited but is preferably about 0.10 from the viewpoint of industrial productivity. If it exceeds 0.22, oxidation stability and heat resistance are deteriorated and it is difficult to achieve high-density recording. In addition, if the average minor axis diameter is less than 0.025 μm, satisfactory oxidation stability and heat resistance cannot be achieved, while if it exceeds 0.045 μm, the desired coercive force cannot be achieved. Further, if the average aspect ratio is less than 5, the desired coercive force cannot be achieved, while if it exceeds 10, the coercive force becomes too high, or oxidation stability and heat resistance are deteriorated.

The particles constituting the spindle-shaped goethite particles according to the present invention have a BET specific surface area of preferably 100 to 150 $m^2/g$. If the BET specific surface area is less than 100 $m^2/g$, the particles are relatively large and the desired coercive force cannot be achieved, while it exceeds 150 $m^2/g$, the coercive force becomes high and oxidation stability and heat resistance are deteriorated.

The particles constituting the spindle-shaped goethite particles according to the present invention contain not less than 0.5 and less than 8 atom % of Co based on the total Fe and 5 to 10 atom % of Al based on the total Fe. If the Co content is less than 0.5 atom %, there is no effect of improving magnetic characteristics, while if it is not less than 8 atom %, it is difficult to control the particle size. Further, if the Al content is less than 5 atom %, there is no sintering preventing effect, whereas if it exceeds 10 atom %, particularly saturation magnetization is lowered.

The crystallite size ratio D020/D110 of the particles constituting the spindle-shaped goethite particles according to the present invention is preferably 1.8 to 2.4. The crystallite size D020 is preferably 200 to 280 Å, and D110 is preferably 100 to 140 Å. If D020/D110 is less than 1.8, there is the tendency that retention of shape during heat dehydration or heat reduction is unsatisfactory, the dispersibility of the resulting metal magnetic particles in a coating material is lowered and the distribution of coercive force is also deteriorated. On the other hand, if D020/D110 exceeds 2.4, there is the tendency that metal magnetic particles having the desired coercive force are hardly obtained, although those having the desired particle size can be obtained.

The particles constituting the spindle-shaped goethite particles according to the present invention comprise a seed crystal part and a surface layer part, wherein Co is present in the seed crystal part and the surface layer part, while Al is present only in the surface layer part.

The seed crystal part refers-to a goethite seed crystal particle part, which is formed by oxidation of ferrous salts added before the addition of the Al compound. Specifically, it is the part of the weight ratio of Fe determined by the degree of oxidation of $Fe^{2+}$, and preferably it is the part of 40 to 50% by weight from the center of the seed crystal particle.

The crystallite size ratio D020/D020 (seed crystal particles) of the particles constituting the spindle-shaped goethite particles of the present invention to the seed crystal particles is preferably 1.05 to 1.20, and D110/D110 (seed crystal particles) is preferably 1.02 to 1.10. If D020/D020 (seed crystal particles) exceeds 1.20 and D110/D110 (seed crystal particles) exceeds 1.10, the amount of the goethite layer in the surface layer part is too large, and it is difficult to control the shape of goethite particles. On the other hand, if D020/D020 (seed crystal particles) is less than 1.05 and D110/D110 (seed crystal particles) is less than 1.02, the amount of the Al-containing goethite layer in the surface layer part is too small, and the sintering preventing effect during dehydration heating and heat reduction tends to be significantly lowered.

Assuming that the proportion of total Co present in the whole of particles constituting the spindle-shaped goethite particles according to the present invention is 100, the proportion of Co present in the seed crystal part, based on the total Co, is preferably 75 to 95, more preferably 80 to 90. Further, the proportion of Co present in the surface layer part, based on the total Co, is preferably 103 to 125, more preferably 106 to 120. If the proportion of Co present in the seed crystal part is less than 75 and the proportion of Co present in the surface layer part exceeds 125, the Co content in the seed crystal part is so low that Co hardly alloys, and further the surface layer becomes so rich in Co that it is likely that retention of shape during reduction is difficult while the magnetic characteristics are deteriorated. On the other hand, if the proportion of Co present in the seed crystal part exceeds 95 and the proportion of Co present in the surface layer part is less than 103, the Co content in the seed crystal part is so large that Co alloys easily, but the amount of Al simultaneously present is too high relative to the amount of Co in the surface layer part, and thus it is likely that Co in the surface layer does not alloy well and the magnetic characteristics are deteriorated as a whole.

Said surface layer part refers to a goethite layer which has grown on the surface of the goethite seed crystal particle after the addition of the Al compound in the growth reaction. Specifically, it is the part of 50 to 60% by weight of Fe from the outermost surface of the particle. Further, Al is present in only the surface layer, and its content is 5 to 10 atom % based on the total Fe. If it is less than 5 atom %, a sufficient sintering preventing effect cannot be achieved upon metalization. On the other hand, if it exceeds 10 atom %, magnetic characteristics, particularly saturation magnetization, are lowered, and further the growth of crystals inside the particles is inhibited and thus the coercive force is hardly exhibited.

Now, the process for producing the spindle-shaped goethite particles according to the present invention is described.

The particles constituting the spindle-shaped goethite particles according to the present invention are obtained by forming spindle-shaped goethite seed crystal particles and then allowing a goethite layer to grow on the surface of the seed crystal particles.

The spindle-shaped goethite seed crystal particles are obtained as follows: An aqueous suspension containing ferrous iron-containing precipitates obtained by reacting an aqueous alkali mixture consisting of an alkali carbonate aqueous solution and an alkali hydroxide aqueous solution with a ferrous salt aqueous solution is aged in a nonoxidizing atmosphere, then an oxygen-containing gas is passed through said aqueous suspension to form spindle-shaped goethite seed crystal particles by oxidation reaction, wherein a Co compound containing not less than 0.5 and less than 8 atom % of Co based on the total Fe is added, at a stage within ½ of the total aging time, to the aqueous suspension containing the ferrous iron-containing precipitates during aging before initiation of oxidation reaction, and the oxidation reaction is carried out in the range of 40 to 50% of the total $Fe^{2+}$. If the Co compound is added at a stage exceeding ½ of the total aging time, the goethite particles having the desired aspect ratio and particle size cannot be obtained. Further, if the oxidation reaction is less than 40% or more than 50% of the total $Fe^{2+}$, the goethite particles having the desired aspect ratio and particle size are hardly obtained.

Usually, said suspension in a nonoxidizing atmosphere is aged preferably at a temperature ranging from 40 to 80° C. In the case of lower than 40° C., the aspect ratio is small and a sufficient aging effect is hardly achieved, while in the case of higher than 80° C., magnetite may be mixed in the resulting particles. The aging time is usually 30 to 300 minutes. In the case of shorter than 30 minutes or longer than 300 minutes, the particles having the desired aspect ratio are hardly obtained.

The nonoxidizing atmosphere is achieved by introducing an inert gas (such as nitrogen gas) or a reducing gas (such as hydrogen gas) into the reaction vessel containing the above suspension.

As the ferrous salt aqueous solution in the reaction of forming the spindle-shaped goethite seed crystal particles, a ferrous sulfate aqueous solution, a ferrous chloride aqueous solution and the like can be used. These are used alone or in combination thereof as necessary.

The aqueous alkali mixture used in the reaction of forming the spindle-shaped goethite seed crystal particles are obtained by mixing an alkali carbonate aqueous solution with an alkali hydroxide aqueous solution. The mixing ratio (expressed in terms of normality-%) in this case is that the proportion of the alkali hydroxide aqueous solution is preferably 10 to 40% (in terms of normality-%), more preferably 15 to 35% (in terms of normality-%). In the case of less than 10%, the desired aspect ratio may not be obtained, while in the case of more than 40%, granular magnetite may be mixed with the resulting particles.

As the alkali carbonate aqueous solution, a sodium carbonate aqueous solution, a potassium carbonate aqueous solution, an ammonium carbonate aqueous solution and the like are usable, and as the alkali hydroxide aqueous solution, sodium hydroxide, potassium hydroxide and the like are usable. These are used alone or in combination thereof as necessary.

The amount of the aqueous alkali mixture, in terms of the equivalent ratio thereof to the total Fe in the ferrous salt aqueous solution, is 1.3 to 3.5, preferably 1.5 to 2.5. In the case of less than 1.3, magnetite may be mixed with the resulting particles, while an equivalent ratio exceeding 3.5 is not preferable industrially.

After mixing the ferrous salt aqueous solution with the aqueous alkali mixture, the ferrous concentration is preferably 0.1 to 1.0 mol/l, more preferably 0.2 to 0.8 mol/l. A concentration of less than 0.1 mol/l is not preferable industrially due to low yield. A concentration of more than 1.0 mol/l brings about a broad particle size distribution and is thus not preferable.

The pH value in the reaction of forming the spindle-shaped goethite seed crystal particles is preferably in the range of 8.0 to 11.5, more preferably 8.5 to 11.0. If the pH is less than 8.0, a large amount of acid ladicals are contained in the goethite particle powder and cannot be easily removed even by washing, which may cause sintering of the particles in case of forming magnetic iron-based alloy particle powder. On the other hand, if the pH exceeds 11.5, the resulting magnetic iron-based alloy particle powder fails to achieve the desired high coercive force.

The reaction of forming the spindle-shaped goethite seed crystal particles is conducted through oxidation reaction by passing an oxygen-containing gas (e.g. air) through the liquid.

The superficial velocity of an oxygen-containing gas is preferably 0.5 to 3.5 cm/s, more preferably 1.0 to 3.0 cm/s. If it is less than 0.5 cm/s, the oxidation rate is so slow that granular magnetite particles are easily included in the resulting particles, while if it is more than 3.5 cm/s, the oxidation reaction is so rapid that it is difficult to regulate the particles so as to have the desired particle size.

The superficial velocity means the amount of an oxygen-containing gas passing per unit sectional area (the bottom sectional area of a cylindrical column reactor, the pore diameter of a nest plate and the number of pores are not considered.), and its unit is cm/s (sec).

The temperature in the reaction of forming the spindle-shaped goethite seed crystal particles may be not higher than 80° C., at which goethite particles are usually formed. In the case of higher than 80° C., magnetite may be mixed with the spindle-shaped goethite particles. The temperature is preferably in the range of 45 to 55° C.

In the reaction of forming the spindle-shaped goethite seed crystal particles, the Co compound may be cobalt sulfate, cobalt chloride, cobalt nitrate, etc. These can be used singly or in combination thereof as necessary. The Co compound is added to the aging suspension containing ferrous iron-containing precipitates before oxidation reaction.

The amount of the Co compound added is not less than 0.5 and less than 8 atom % based on the total Fe in the spindle-shaped goethite particles as the final product. In the case of less than 0.5 atom %, the resulting metal magnetic particles do not have the effect of improving magnetic characteristics, while in the case of not less than 8 atom %, the resulting particles are to be fine and those having the desired aspect ratio and size cannot be obtained.

The pH value in the growth reaction of the goethite layer is usually in the range of 8.0 to 11.5, preferably 8.5 to 11.0. If the pH is less than 8.0, acid ladicals are contained in a large amount in the goethite particle powder and cannot be easily removed even by washing, and thus sintering of the resulting metal magnetic particles may be caused. On the other hand, in the case of more than 11.5, the resulting metal magnetic particles may fail to achieve the desired particle distribution.

The growth reaction of the goethite layer is conducted through oxidation reaction by passing an oxygen-containing gas (e.g. air) through the liquid.

Preferably, the superficial velocity of an oxygen-containing gas passed is made larger than in the reaction of forming the seed crystal particles. If it is not made larger, the viscosity of the aqueous suspension is increased when Al is added, and the growth in the direction of the minor axis is promoted, the aspect ratio is decreased, and those having the desired aspect ratio may not be obtained. However, this does not apply if the superficial velocity in the reaction of forming the seed crystal particles is not less than 2.0 cm/s.

Usually, the temperature in the growth reaction of the goethite layer may be a temperature of not higher than 80° C. at which goethite particles are formed. At a temperature exceeding 80° C., magnetite may be mixed with the spindle-shaped goethite particles. Preferably, it is in the range of 45 to 55° C.

In the growth reaction of the goethite layer, the Al compound includes acid salts such as aluminum sulfate, aluminum chloride and aluminum nitrate and aluminates such as sodium aluminate, potassium aluminate and ammonium aluminate. These are used alone or in combination thereof as necessary.

The Al compound may be added at the same time when the superficial velocity of the oxygen-containing gas is preferably increased as compared with that at the reaction of forming seed crystal particles. If Al is added for a prolonged period of time, the gas may be exchanged with a nitrogen-containing gas so as not to permit the progress of oxidation reaction. If the Al compound is added in divided portions or added continuously or intermittently under passage of the oxygen-containing gas, the sufficient effect of the present invention cannot be obtained.

The amount of the Al compound added is 5 to 10 atom % based on the total Fe in the spindle-shaped goethite particles as the final product. In the case of less than 5 atom %, a sufficient sintering preventing effect cannot be achieved during metalization, whereas in the case of more than 10 atom %, formation of particles other than goethite is also induced, and magnetic characteristics, particularly saturation magnetization, are reduced, and the growth of crystal inside the particles is prevented and thus the coercive force is hardly exhibited.

Next, the spindle-shaped hematite particles according to the present invention is described.

The particles constituting the spindle-shaped hematite particles according to the present invention have an average major axis diameter of 0.17 to 0.28 µm and the size distribution (standard deviation/average major axis diameter) is not more than 0.20. Further, the average minor axis diameter is 0.022 to 0.035 µm. The particles are spindle-shaped with an average aspect ratio (major axis diameter/minor axis diameter) of 5 to 10. If the average major axis diameter is less than 0.17 µm, the coercive force of the resulting metal magnetic particles becomes too high, and the dispersibility thereof in a coating material is deteriorated, and the weatherability of their coating film is easily deteriorated. On the other hand, if it exceeds 0.28 µm, the desired coercive force is hardly obtained in the range of the aspect ratio of the present invention. Further, since the size distribution thereof in a lower range is better, the lower limit is not particularly limited but is preferably about 0.10 from the viewpoint of industrial productivity. On the other hand, if it exceeds 0.20, oxidation stability and heat resistance are deteriorated and it is difficult to achieve high-density recording. In addition, if the average minor axis diameter is less than 0.022 µm, satisfactory oxidation stability and heat resistance cannot be achieved, while if it exceeds 0.035 µm, the desired coercive force cannot be achieved. Further, if the average aspect ratio is less than 5, the desired coercive force cannot be achieved, while if it exceeds 10, the coercive force becomes too high, or oxidation stability and heat resistance are deteriorated.

The spindle-shaped hematite particles according to the present invention have a BET specific surface area of preferably 30 to 70 m$^2$/g, more preferably 35 to 65 m$^2$/g. If the BET specific surface area is less than 30 m$^2$/g, sintering in the heat treatment step has already occurred with the particle size of the present invention, and the size distribution is deteriorated, the size distribution of the metal magnetic particles is also deteriorated, and the SFD of the coating film is also deteriorated. On the other hand, if it exceeds 70 m$^2$/g, sintering prevention in the heat reduction step is insufficient, the size distribution of the metal magnetic particles is deteriorated, and the SFD of the coating film is also deteriorated.

The particles constituting the spindle-shaped hematite particles according to the present invention contain not less than 0.5 and less than 10 atom % of Co based on the total Fe, 5 to 10 atom % of Al based on the total Fe, and 1 to 5 atom % of a rare earth element based on the total Fe wherein the ratio of Al/rare earth element (atom % based on Fe) is 1.5 to 5.

The crystallite size ratio D110/D104 of the particles constituting the spindle-shaped hematite particles according to the present invention is 2.0 to 4.0. The crystallite size D104 is 100 to 150 Å, and D110 is 200 to 300 Å. If D110/D104 is less than 2.0, growth of particles during dehydration heating occurs excessively, and along with growth in the direction of the minor axis, the particle size distribution is worsened, the coercive force of the resulting metal magnetic particles is low, and the dispersibility is also deteriorated. On the other hand, if D110/D104 exceeds 4.0, growth of crystals by dehydration heating is unsatisfactory, the effect of retention of shape during heat reduction cannot be expected, the coercive force is reduced, and the particle size distribution is also deteriorated.

The particles constituting the spindle-shaped hematite particles according to the present invention comprise a seed crystal part, an intermediate layer part and an outermost layer part wherein Co is present in the seed crystal part and the intermediate layer part, Al is present in only the intermediate layer part and the rare earth element is present only in the outermost layer part.

The seed crystal part described above refers to a part formed by the seed crystal part of the goethite particles, and it is preferably the part of 40 to 50 weight % of Fe from the center of the seed crystal particles. The intermediate layer part refers to a part formed by the surface layer part of the goethite particles, and it is preferably the part of 50 to 60 weight % of Fe from the outermost surface excluding the outermost layer consisting of the rare earth element compound in the surface of the particles.

Assuming that the proportion of the total Co present in the whole of particles constituting the spindle-shaped hematite particles according to the present invention is 100, the proportion of Co present in the seed crystal part, based on the total Co, is preferably 75 to 95, more preferably 80 to 90. Further, the proportion of Co present in the intermediate layer part, based on the total Co, is preferably 103 to 125, more preferably 106 to 120. If the proportion of Co present in the seed crystal part is less than 75 and the proportion of Co present in the intermediate layer part exceeds 125, the Co content in the seed crystal part is so low that Co hardly alloys, and further the intermediate layer becomes so rich in Co that it is likely that retention of shape during reduction is difficult while the magnetic characteristics are deteriorated. On the other hand, if the proportion of Co present in the seed crystal part exceeds 95 and the proportion of Co present in the intermediate layer part is less than 103, the Co content in the seed crystal part is so large that Co alloys easily, but the amount of Al simultaneously present is too high relative to the amount of Co in the intermediate layer, and thus it is likely that Co in the surface layer does not alloy well and the magnetic characteristics are deteriorated as a whole. If Co is allowed to be present as necessary in the outermost layer, Co acts in a different way and is considered to act on the control of the reduction rate as a whole or on the oxidation stability of the outermost surface. On the other hand, said Co is considered to be important in that it is present along with the Fe element inside the particles and participates directly in alloying mainly with Fe present in each layer.

The content of the Co compound is not less than 0.5 and less than 10 atom % based on the total Fe. In the case of less than 0.5 atom %, the resulting metal magnetic particles have no effect of improving magnetic characteristics, while in the case of not less than 10 atom %, regulation of the reduction rate is difficult and destruction of shape easily occurs.

Al is present only in the intermediate layer part and the amount of Al is 5 to 10 atom % based on the total Fe. In the case of less than 5 atom %, a sufficient sintering preventing effect cannot be achieved in metalization. On the other hand, in the case of more than 10 atom %, magnetic characteristics, particularly saturation magnetization, are reduced, and the growth of crystals inside the particles is prevented and thus the coercive force is hardly exhibited.

The outermost layer part comprises the rare earth compound. The content of the rare earth element in the outermost layer part is 1 to 5 atom % based on the total Fe. In the case of less than 1 atom %, the sintering preventing effect is not satisfactory, and the resulting metal magnetic particles have a deteriorated size distribution and the SFD of their coating film is also deteriorated. In the case of more than 5 atom %, a significant reduction in saturation magnetization occurs.

The ratio (Al/rare earth element) of the Al element to the rare earth element is 1.5 to 5. In the case of less than 1.5, the resulting metal magnetic particles hardly achieves satisfactory oxidation stability, while in the case of more than 5, sufficient heat resistance cannot be achieved, and the ignition temperature is easily lowered.

Next, the process for producing the spindle-shaped hematite particles according to the present invention is described.

In the present invention., the spindle-shaped goethite particles obtained in the manner-described above are previously coated thereon with a sintering preventing agent for preventing sintering prior to heat dehydration treatment.

As the sintering preventing agent, a compound of a rare earth element is used. The compound of a rare earth element is preferably a compound of at least one element selected from the group consisting of scandium, yttrium, lanthanum, cerium, praseodymium, neodymium and samarium etc., and a chloride, a sulfate and a nitrate of these rare earth elements can be used. The treatment method may be a dry or wet process and is preferably coating treatment in a wet process.

The amount thereof used is preferably 1 to 5 atom % based on the total Fe. In the case of less than 1 atom %, the sintering preventing effect is not satisfactory, and the size distribution as well as the SFD of a coating film is deteriorated. In the case of more than 5 atom %, saturation magnetization is significantly lowered.

In the present invention, the rare earth element is added such that the ratio of Al/rare earth element in the spindle-shaped goethite is 1.5 to 5 (percentage of an atomic ratio of an element to the total Fe). If the ratio is less than 1.5, the resulting metal magnetic powder does not achieve satisfactory oxidation stability. On the other hand, if it exceeds 5, sufficient heat resistance cannot be achieved, and further the amount of the rare earth element having a sintering preventing effect is too low, and thus the effect of retention of shape in metalization is not satisfactory.

One or more compounds of an element selected from the group consisting of Al, Si, B, Ca, Mg, Ba, Sr, Co and Ni as other auxiliary elements for improving the sintering preventing effect and for regulating magnetism may be used as necessary. Since these compounds have not only a sintering preventing effect, but also a function of controlling the reduction rate, it is preferable to use them in the form of a combination, as necessary. However, if they are added in a too large amount, the saturation magnetization of the resulting metal magnetic particles is reduced and thus the optimum amount had better be selected suitably depending on their combination.

By previously coating the particles with the sintering preventing agent, the sintering of the particles and among the particles can be prevented, and spindle-shaped hematite particles maintaining and inheriting the shape and aspect ratio of the spindle-shaped goethite particles can be obtained, whereby spindle-shaped magnetic iron-based alloy particles maintaining and inheriting the shape, etc. described above can be easily obtained.

When the spindle-shaped goethite particles coated with the sintering preventing agent are to be heat treated in the range of 650 to 800° C. in a non-reducing atmosphere, the particles are heat treated such that the crystallite size D104 of the resulting spindle-shaped hematite particles is in the range of 0.9 to 1.1 as D104/D110 (goethite). If the heat treatment temperature is lower than 650° C., said ratio easily becomes less than 0.9, while at a temperature of higher than 800° C., said ratio easily exceeds 1.1. If D104/D110 (goethite) is less than 0.9, the particle size distribution of the resulting metal magnetic particles is broad and the SFD of their coating film is deteriorated. If D104/D110 (goethite) exceeds 1.1, the shape of hematite is destroyed and sintering occurs, and metal magnetic particles made therefrom has a broad particle size distribution, a sintered body is also present, and both the squareness and SFD of their coating film are deteriorated.

Further, the hematite particles after heat treatment may be washed to remove impurity salts such as $Na_2SO_4$. In this case, it is preferable that the particles are washed under conditions where the coated sintering preventing agent is not eluted, whereby unnecessary impurities are removed.

Specifically, washing can be carried out effectively while the pH is increased to remove cationic impurities or the pH is decreased to remove anionic impurities.

Then, the spindle-shaped magnetic iron-based alloy particles according to the present invention are described.

The particles constituting the spindle-shaped magnetic iron-based alloy particles according to the present invention have an average major axis diameter of 0.15 to 0.25 μm and the size distribution (standard deviation/average major axis diameter) is not more than 0.30. Further, the average minor axis diameter is 0.015 to 0.025 μm. The particles are spindle-shaped with an average aspect ratio (major axis diameter/minor axis diameter) of 5 to 9. If the average major axis diameter is less than 0.15 μm, the coercive force becomes too high, and the dispersibility thereof in a coating material is deteriorated, and the weatherability of their coating film is easily deteriorated. On the other hand, if it exceeds 0.25 μm, the desired coercive force is hardly obtained in the range of the aspect ratio of the present invention. Further, since the size distribution thereof in a lower range is better, the lower limit is not particularly limited but is preferably about 0.10 from the viewpoint of industrial productivity. On the other hand, if it exceeds 0.30, oxidation stability and heat resistance are deteriorated and also SFD in a coating film is deteriorated and it is difficult to achieve high-density recording. In addition, if the average minor axis diameter is less than 0.015 μm, satisfactory oxidation stability and heat resistance cannot be achieved, while if it exceeds 0.025 μm, the desired coercive force cannot be achieved. Further, if the average aspect ratio is less than 5, the desired coercive force cannot be achieved and both the squareness and orientation ratio of the coating film are deteriorated. On the other hand, if it exceeds 9, the coercive force becomes too high, or oxidation stability and heat resistance are deteriorated.

The spindle-shaped magnetic iron-based alloy particles according to the present invention have a specific surface area of preferably 30 to 60 $m^2/g$, more preferably 35 to 55 $m^2/g$. If the specific surface area is less than 30 $m^2/g$, sintering in the heat reduction step has already occurred, and the squareness of the coating film is hardly improved, while a specific surface area of more than 60 $m^2/g$ is not preferable because the viscosity of thereof in a coating material becomes too high, thus making dispersion of the particles difficult.

The particles constituting the spindle-shaped magnetic iron-based alloy particles according to the present invention contain not less than 0.5 and less than 10 atom % Co based on the total Fe. Further, the particles contain 5 to 10 atom % of Al based on the total Fe. Further, the particles contain 1 to 5 atom % of a rare earth element based on the total Fe and the ratio of Al/rare earth element is 1.5 to 5. The reasons for these limitations are the same as for the spindle-shaped hematite particles.

The absolute value of the oxidation stability (Δσs) of saturation magnetization (σs) of the particles constituting the spindle-shaped magnetic iron-based alloy particles according to the present invention after 1 week of a promotion test with time under the environment of a temperature of 60° C. and a relative humidity of 90% is not more than 10%, preferably not more than 8%, and the ignition temperature is not lower than 135° C., preferably not lower than 140° C.

The coercive force (Hc) of the spindle-shaped magnetic iron-based alloy particles according to the present invention is 103.5 to 143.2 KA/m (1300 to 1800 Oe), preferably 107.4 to 139.3 KA/m (1350 to 1750 Oe). Further, the saturation magnetization (σs) is 110 to 160 $Am^2/Kg$ (110 to 160 emu/g).

The crystallite size D110 of the spindle-shaped magnetic iron-based alloy particles according to the present invention is 130 to 180 Å, preferably 140 to 170 Å.

The squareness (Br/Bm) as a coating characteristic of the spindle-shaped magnetic iron-based alloy particles according to the present invention in the magnetic field orientation of 397.9 KA/m (5 kOe) is preferably not less than 0.84, more preferably not less than 0. 85, and the orientation (OR) thereof is preferably not less than 2.8, more preferably not less than 2.9, and the coercive force distribution (SFD) thereof is preferably not more than 0.53, more preferably not more than 0.52. Further, the squareness (Br/Bm) thereof as a coating characteristic in the magnetic field orientation of 238.7 KA/m (3 kOe) is preferably not less than 0.82, more preferably not less than 0.83, and the orientation (OR) thereof is preferably not less than 2.6, more preferably not less than 2.7, and the coercive force distribution (SFD) thereof is preferably not more than 0.54, more preferably not more than 0.53.

The weatherability (ΔBm) as a coating characteristic of the spindle-shaped magnetic iron-based alloy particles according to the present invention in the magnetic field orientation of 397.9 KA/m (5 kOe) is not more than 8%, preferably not more than 6%.

Next, the process for producing the spindle-shaped magnetic iron-based alloy particles according to the present invention is described.

In the present invention, the spindle-shaped magnetic iron-based alloy particles can be obtained by heat reducing the spindle-shaped hematite particles according to the present invention described above.

The temperature range for heat reduction is preferably 400 to 700° C. In the case of lower than 400° C., the progress of reduction reaction is slow and a long time is required. On the other hand, in the case of higher than 700° C., the reduction reaction may proceed rapidly to cause deformation of the particles and sintering of the particles and among the particles.

The spindle-shaped magnetic iron-based alloy particles after heat reduction can be taken out in the air by any known methods such as a method of immersing them in an organic solvent such as toluene, a method of replacing the atmosphere for the spindle-shaped magnetic iron-based alloy particles after reduction by an inert gas and then increasing the content of oxygen in the inert gas to replace the inert gas by the air, and a method of gradual oxidization with a mixed gas of oxygen and steam.

In heat reducing the spindle-shaped hematite particles, it is preferable to obtain the spindle-shaped magnetic iron-based alloy particles by introducing the hematite particles into a reduction apparatus to form a fixed bed, then heat reducing them. It is preferable that the above-mentioned spindle-shaped hematite particles are granulated by an ordinary process into granules with an average particle size of 1 to 5 mm and used to form the fixed bed. As the reduction apparatus in which the fixed bed is formed, it is preferred to use a transfer-bed reduction apparatus (continuous system) in which the fixed bed is formed on a belt or a tray and the reduction is conducted with the belt or the tray being transferred. The bed height of the starting material is preferably 3 to 15 cm, more preferably 4 to 14 cm. In the case of higher than 15 cm, partial pressure of steam by rapid reduction at a lower part of the fixed bed increases and undesired problems such as a decrease in coercive force of the particles at the upper part of the fixed bed take place, whereby the characteristics are degraded as a whole. On the other hand, in the csae of lower than 3 cm, the granules are sometimes scattered though depending upon the superficial velocity of gas and thus it is not desired. The bed height is still more preferably 3 to 14 cm if the industrial productivity is taken into consideration.

The atmosphere in which the spindle-shaped hematite particles are heated at a reducing temperature of 400 to 700° C. is a reducing atmosphere. As the reducing gas, hydrogen is preferable. In the case of an atmosphere other than the reducing gas, especially an inert gas atmosphere such as nitrogen, the reduction takes place rapidly to cause ununiform growth of particles which does not give particles with a high coercive force, when changeover to a reducing gas was made in a reducing step after rise in temperature, as will be shown by comparative examples.

The superficial velocity of a-reducing gas in the heating-up step is preferably 40 to 150 cm/s, more preferably 40 to 140 cm/s. If it is less than 40 cm/s, since the release speed of steam generated through the reduction reaction of the hematite particles from the system is so slow that the coercive force of the resulting spindle-shaped magnetic iron-based alloy particles at the upper part of the bed and the SFD of their coating film lower, and thus particles with a high coercive force cannot be obtained as a whole. In the case of more than 150 cm/s, the intended spindle-shaped magnetic iron-based alloy particles can be obtained, but problems such as need of a higher reducing temperature and scattering or destruction of granules take place and thus, it is not preferable.

The heating-up speed is preferably 10 to 80° C./min., more preferably 20 to 70° C./min. If it is less than 10° C./min., the reduction reaction proceeds very slowly from the lower part of bed at a low temperature region, and thus, the magnetic iron-based alloy particles having a very small crystallite size tend to be produced. Further, the release speed of steam generated from the system is slow, and thus, the coercive force of the resulting spindle-shaped magnetic iron-based alloy particles at the upper part of the bed and the SFD of their coating film not only lower, but crystallizability of the particles at the lower part of the bed, and thus, the particles with a high coercive force cannot be obtained as a whole. If it is more than 80° C./min., the behavior is close to that as in the case where heating-up is conducted in a nitrogen atmosphere, that is, the reduction reaction proceeds rapidly, the transfer to α-Fe occurs under the conditions where the partial pressure of steam is relatively high, and thus, the crystallite size of the resulting magnetic iron-based alloy particles is large, the coercive force thereof lowers and the SFD of their coating film is degraded.

The atmosphere in the heat reducing step is a reducing atmosphere and as a reducing gas, hydrogen is preferable.

The temperature in the heat reducing step is 400 to 700° C., preferably 400 to 650° C., more preferably 400 to 600° C. It is preferable to select the optimum temperature from the range as mentioned above according to the kind and the amount of coating compounds of the starting material. If it is lower than 400° C., the reduction reaction is slow and thus it is not preferable from the industrial viewpoint, and the saturation magnetization of the resulting spindle-shaped metal magnetic particles is also low. If it is higher than 700° C., the reduction reaction proceeds so rapidly that destruction of the particle shape and sintering of particles are brought about, which results in a decrease in coercive force.

By the selection of the specific reducing conditions as stated above, the reduction reaction proceeds uniformly over the entire fixed bed so that a difference in magnetic characteristics of the particles between upper and lower parts of the fixed bed is small. As a result, the spindle-shaped magnetic iron-based alloy particles are more excellent in dispersibility (high squareness, high orientation) even in a low magnetic field, and further, are excellent in coercive force distribution as well as in weatherability.

For example, as for a difference in magnetic characteristics of the particles between upper and lower parts of the fixed bed, not more than 3.2 KA/m (40 Oe), preferably not more than 2.4 KA/m (30 Oe) in coercive force, not more than 4 $Am^2$/Kg (4 emu/g), preferably not more than 3 $Am^2$/Kg (3 emu/g) in saturation magnetization, not more than 0.003, preferably not more than 0.002 in squareness (σr/σs), not more than 8 Å, preferably not more than 6 Å in crystallite size D110 can be attained.

In the above-mentioned way, the particles constituting the spindle-shaped magnetic iron-based alloy particles having such preferable characteristics as shown below can be obtained. That is, the particles have an average major axis diameter of 0.15 to 0.25 vm and the size distribution (standard deviation/average major axis diameter) is not more than 0.26. Further, the average minor axis diameter is 0.015 to 0.025 µm. The particles are spindle-shaped with an average aspect ratio (major axis diameter/minor axis diameter) of 5 to 9. If the average major axis diameter is less than 0.15 µm, the coercive force becomes too high, and the dispersibility thereof in a coating material is deteriorated, and the weatherability of their coating film is easily deteriorated. On the other hand, if it exceeds 0.25 µm, the desired coercive force is hardly obtained in the range of the aspect ratio of the present invention. Further, since the size distribution thereof in a lower range is better, the lower limit is not particularly limited but is preferably about 0.10 from the viewpoint of industrial productivity. On the other hand, though it may exceed 0.26, further improvement in oxidation stability, heat resistance and SFD in a coating film is not expected. In addition, if the average minor axis diameter is less than 0.015 µm, satisfactory oxidation stability and heat resistance cannot be achieved, while if it exceeds 0.025 µm, the desired coercive force cannot be achieved. Further, if the average aspect ratio is less than 5, the desired coercive force cannot be achieved and both the squareness and orientation ratio of the coating film are deteriorated. On the other hand, if it exceeds 9, the coercive force becomes too high, or oxidation stability and heat resistance are deteriorated.

The spindle-shaped magnetic iron-based alloy particles according to the present invention have a specific surface area of preferably 30 to 60 m²/g, more preferably 35 to 55 m²/g. If the specific surface area is less than 30 m²/g, sintering in the heat reduction step has already occurred, and the squareness of the coating film is hardly improved, while a specific surface area of more than 60 m²/g is not preferable because the viscosity of thereof in a coating material becomes too high, thus making dispersion of the particles difficult.

The particles constituting the spindle-shaped magnetic iron-based alloy particles according to the present invention contain not less than 0.5 and less than 10 atom % of Co based on the total Fe. Further, the particles contain 5 to 10 atom % of Al based on the total Fe. Further, the particles contain 1 to 5 atom % of a rare earth element based on the total Fe and the ratio of Al/rare earth element is 1.5 to 5. The reasons for these limitations are the same as for the spindle-shaped hematite particles.

The absolute value of the oxidation stability (Δσs) of saturation magnetization (σs) of the particles constituting the spindle-shaped magnetic iron-based alloy particles according to the present invention after 1 week of a promotion test with time under the environment of a temperature of 60° C. and a relative humidity of 90% is not more than 6%, and the ignition temperature is not lower than 145° C.

The coercive force (Hc) of the spindle-shaped magnetic iron-based alloy particles according to the present invention is 103.5 to 143.2 KA/m (1300 to 1800 Oe), preferably 107.4 to 139.3 KA/m (1350 to 1750 Oe). Further, the saturation magnetization (σs) is 110 to 160 Am²/Kg (110 to 160 emu/g), and the squareness (σr/σs) is not less than 0.50. Further the crystallite size D110 is 130 to 180 Å, preferably 140 to 170 Å.

The squareness (Br/Bm) as a coating characteristic of the spindle-shaped magnetic iron-based alloy particles according to the present invention in the magnetic field orientation of 397.9 KA/m (5 kOe) is preferably not less than 0.85, more preferably not less than 0. 86, and the orientation (OR) thereof is preferably not less than 3.1, more preferably not less than 3.2, and the coercive force distribution (SFD) thereof is preferably not more than 0.51, more preferably not more than 0.50. Further, the squareness (Br/Bm) thereof as a coating characteristic in the magnetic field orientation of 238.7 KA/m (3 kOe) is preferably not less than 0.84, more preferably not less than 0.85, and the orientation (OR) thereof is preferably not less than 3.0, more preferably not less than 3.1, and the coercive force distribution (SFD) thereof is preferably not more than 0.52, more preferably not more than 0.51. Further, the weatherability (ΔBm) in the magnetic field orientation of 397.9 KA/m (5 kOe) is not more than 5%.

Preferred Embodiment 1

The average major axis diameter, minor axis diameter and aspect ratio of each particle were expressed as mean values measured from electron micrographs. The standard deviation was simultaneously determined, and a value obtained by dividing the standard deviation by the average major axis diameter was expressed as size distribution.

The specific surface area of particles was expressed as a value determined by the BET method using "Monosorb MS-11" (Kantachrom Co., Ltd.).

The crystallite size of each particle indicates the thickness of a crystal particle in a direction perpendicular to each crystal face of each particle, which was measured by X-ray diffraction, and the crystallite size was calculated from a diffraction peak curve for each crystal face by using the following Sheller's equation:

$$\text{Crystallite size} = K\lambda/\beta\cos\theta$$

wherein

β=half of the width (radian unit) of a true diffraction peak where machine width attributable to the device has been corrected.

K=Sheller constant (=0.9)

λ=X-ray wavelength (Cu Kα ray, 0.1542 nm)

θ=diffraction angle (corresponding to a diffraction peak of each crystallite face).

The magnetic characteristics of the magnetic iron-based alloy particles were measured in an external magnetic field of 795.8 KA/m (10 kOe) by use of "Vibrating Sample Magnetometer VSM-3S-15" (Toei Kogyo Co., Ltd.).

The amounts of Co, Al and rare earth elements in the spindle-shaped goethite particles and in the spindle-shaped magnetic iron-based alloy particles were measured by "Inductively Coupled Plasma Emission Spectroscopic Analyzer SPS4000" (Seiko Denshi Kogyo Co., Ltd.).

A magnetic coating material prepared by introducing the following ingredients in the following amounts into 100 ml polyvinyl bottle, mixing, and dispersing the mixture for 8 hours by a paint shaker (Red Devil Co., Ltd.) was coated by an applicator onto a polyethylene terephthalate film of 25 µm in thickness to form a coating of 50 µm in thickness thereon and then dried in two magnetic fields of 238.7 KA/m (3 kOe) and 397.9 KA/m (5 kOe) to give a magnetic coating film.

| | |
|---|---|
| 3 mm ø steel ball | 800 parts by weight |
| Spindle-shaped magnetic iron-based alloy particles | 100 parts by weight |
| Polyurethane resin having sodium sulfonate group | 20 parts by weight |
| Cyclohexane | 83.3 parts by weight |
| Methyl ethyl ketone | 83.3 parts by weight |
| Toluene | 83.3 parts by weight |

The magnetic characteristics of the resulting magnetic coating film were measured.

For the oxidation stability (Δσs) of saturation magnetization (σs) of the powder and the oxidation stability (ΔBm) of saturation magnetic flux density (Bm) of the magnetic coating film, after a promotion test with time in which the powder or the magnetic coating film was left in a thermostatic chamber at a temperature of 60° C. under 90% relative humidity for 1 week, the saturation magnetization of the powder and the saturation magnetic flux density of the magnetic coating film were measured respectively, and the difference (absolute value) between σs and Bm before the test and σs' and Bm' after 1 week of the promotion test with time was divided by σs and Bm before the test to give Δσs and ΔBm, respectively.

The ignition temperature of the powder was measured using "TG/DTA Measuring Unit SSC5100TG/DTA22" (Seiko Denshi Kogyo K.K.).

The spindle-shaped goethite particle powder, spindle-shaped hematite particle powder and spindle-shaped magnetic iron-based alloy particle powder were produced in the following manner, and their characteristics and physical properties were measured or calculated in the manner described above.

(Production of the Spindle-shaped Goethite Particles)

Thirty liters of aqueous alkali mixture containing 25 mol of sodium carbonate aqueous solution and 19 mol of sodium hydroxide aqueous solution (in the mixed alkali, sodium hydroxide corresponds to 27.5 mol % in terms of normality) was introduced into a bubble column and adjusted to 47° C. while a nitrogen gas was passed therethrough at a superficial velocity of 2.20 cm/s. Then, 20 L of ferrous sulfate aqueous solution containing 20 mol of $Fe^{2+}$ (the aqueous alkali mixture corresponds, in terms of normality, to 1.725 equivalents based on the ferrous sulfate) was introduced into the bubble column and aged for 30 minutes, and then 4 L of cobalt sulfate aqueous solution containing 1.0 mol of $Co^{2+}$ (corresponding to 5 atom % in terms of Co based on the total Fe) was added thereto, and after the mixture was further aged for 4.5 hours (ratio of the stage of adding Co to the total aging time is 10%), the air was passed at a superficial velocity of 1.50 cm/s so that oxidation reaction was conducted until the degree of oxidation of $Fe^{2+}$ reached 40% to form goethite seed crystal particles.

A part of the aqueous suspension containing goethite seed particles which were oxidized until the degree of oxidation of $Fe^{2+}$ reached 40% was removed and rapidly washed with dilute acetic acid solution, filtered off and washed with water, and the resulting goethite seed crystal particles were analyzed for composition, indicating that Fe was 54.00% by weight and Co was 2.45% by weight. Further, the crystallite size D020 (seed crystal particles) was 245 Å, and D110 (seed crystal particles) was 125 Å.

Then, after the amount of the air passed was increased to the superficial velocity of 2.30 cm/s, 1 L of aluminum sulfate aqueous solution containing 1.6 mol of $Al^{3+}$ (corresponding to 8 atom % in terms of Al based on the total Fe) was subjected to oxidation reaction at a rate of not more than 3 ml/sec., and then washed with water by a filter press until the electric conductivity was reduced to 60 μS/cm, to give a press cake.

The goethite particles obtained by drying and grinding a part of the cake in a usual manner were spindle-shaped as shown in the transmission electron micrograph in FIG. 1, and the BET specific area was 135.4 m²/g, the average major axis diameter was 0.275 μm, a (standard deviation) was 0.0459 μm, the size distribution (standard derivation/major axis diameter) was 0.167, the average minor axis diameter was 0.0393 μm, the aspect ratio was 7.0. There were no dendritic particles and the crystallite size D020 of the whole particles was 262 Å and D110 was 131 Å where the ratio of D020/D110 was 2.0. Further, as for the relation of the seed crystal particles with the crystallite size, D020/D020 (seed crystal particles) was 1.07 and D110/D110 (seed crystal particles) was 1.05.

Further, Fe was 51.5% by weight, Co was 2.72% by weight, Al was 1.99% by weight, and comparison with analyzed value of the goethite seed crystal particles indicated that the Co content in the seed crystal part was 4.30 atom % based on the Fe in the seed crystal part. Assuming that the ratio of the total Co in the total particles is 100 based on the total Fe, the ratio of Co present in the seed crystal part was 86.0, and the ratio of Co present in the surface layer part was calculated to be 109.3. In the particles as a whole, the Co content was 5 atom % based on the total Fe, and the Al content was 8 atom % based on the total Fe. Al was present only in the surface layer part.

Then, 40 L of press cake containing 1000 g of the resulting spindle-shaped particles (9.22 mol as Fe) was sufficiently dispersed in water, and then 2 L of a neodymium nitrate aqueous solution containing 121.2 g of neodymium nitrate. $6H_2O$ (corresponding to 3 atom % as Nd based on the total Fe in the goethite particles) was added thereto and stirred, and then 25.0% by weight sodium carbonate aqueous solution was added as a precipitant thereto, and the mixture was adjusted to pH 9.5 and then washed with water with a filter press, and the resulting press cake was molded by extrusion through a molding plate with a pore diameter of 4 mm by means of a compression molding machine and then dried at 120° C., whereby a goethite particle-molded product coated with the Nd compound was obtained. Goethite particles obtained by grinding the particle-molded product had a Co content of 5 atom % based on the total Fe, an Al content of 8 atom % based on the total Fe and an Nd content of 3 atom % based on the total Fe, wherein the ratio of Al to Nd (Al/Nd) (atom % based on the total Fe) was 2.67. Al was present only in the intermediate layer part, and Nd was present only in the outermost layer part.

(Production of the Spindle-shaped Hematite Particles)

The spindle-shaped goethite particles coated with the Nd compound were heat-dehydrated at 730° C. in the air such that the D104 of the resulting spindle-shaped hematite particles was in the range of 0.9 to 1.1 as D104/D110 (goethite particles) relative to the size of D110 of the spindle-shaped goethite particles whereby spindle-shaped hematite particles consisting of spindle-shaped hematite particles having an outermost layer composed of the Nd compound were obtained.

Figure 2:
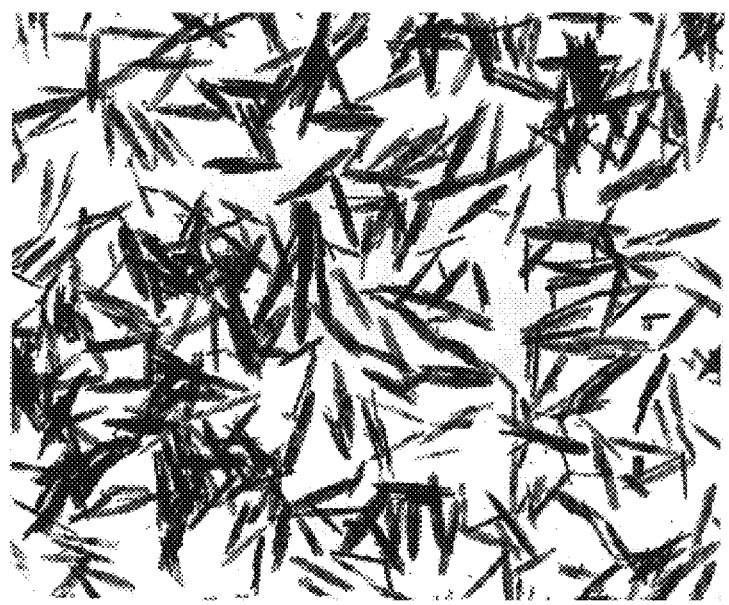
FIG. 2 is a transmission electron micrograph (×30000) of the particle structure of the spindle-shaped hematite particles obtained in the Embodiment 1.

As shown in the transmission electron micrograph in FIG. 2, the resulting spindle-shaped hematite particles had an average major axis diameter of 0.241 μm, σ (standard deviation) of 0.0434 μm, a size distribution (standard deviation/major axis diameter) of 0.180, an average minor axis diameter of 0.0309 μm, an aspect ratio of 7.8, a BET specific surface area of 48.5 m²/g. In the particles, the Co content was 5 atom % based on the total Fe, the Al content was 8 atom % based on the total Fe, and the Nd content was 3 atom % based on the total Fe, wherein Al/Nd was 2.67. The crystallite size D104 was 130 Å, and the ratio thereof to D110 of the goethite particles was 0.99 as D104/D110 (goethite particles). Further, D110 was 285 Å, and the ratio of D110/D104 was 2.19.

(Production of the Spindle-shaped Magnetic Iron-based Alloy Particles)

A hundred grams of the resulting spindle-shaped hematite particles having an outermost layer consisting of the Nd compound was introduced into a fixed-bed reduction apparatus having an inner diameter of 72 mm, and while $H_2$ gas was passed therethrough at a rate of 35 L/min., the particles were heat-reduced at a reduction temperature of 480° C., and the atmosphere was exchanged with a nitrogen gas and cooled to 70° C., then while steam was passed therethrough, the partial pressure of oxygen was gradually increased until it reached the same ratio as in the air whereby a stable oxidized film was formed on the surface of the particles.

Figure 3:
FIG. 3 is a transmission electron micrograph (×30000) of the particle structure of the spindle-shaped magnetic iron-based alloy particles obtained in Embodiment 1.

As shown in the transmission electron micrograph in FIG. 3, the resulting magnetic iron-based alloy particles containing Co, Al and Nd comprised particles having an average major axis diameter of 0.178 μm, σ (standard deviation) of 0.0456 μm, a size distribution (standard deviation/major axis diameter) of 0.256, an average minor axis diameter of 0.0234 μm, an aspect ratio of 7.6, a BET specific surface area of 42.1 m²/g and a D110 (X-ray crystal particle diameter) of 158 Å, and the particle were spindle-shaped having a uniform particle size with less dendritic particles. In the particles, the Co content was 5 atom % based on the total Fe, the Al content was 8 atom % based on the total Fe, and the Nd content was 3 atom % based on the total Fe, wherein the ratio of Al/Nd was 2.67. As to the magnetic characteristics of the spindle-shaped magnetic iron-based alloy particles, the coercive force (Hc) was 122.5 KA/m (1540 Oe), the saturation magnetization (σs) was 128.8 Am²/Kg (128.8 emu/g), the squareness (σr/σs) was 0.498, the absolute value of the oxidation stability (Δσs) of saturation magnetization was 4.9% (measured value—4.9%), and the ignition temperature was 153° C. As to the sheet characteristics thereof in the orientation magnetic field of 397.9 KA/m (5 kOe), the sheet Hc was 117.0 KA/m (1470 Oe), the sheet squareness (Br/Bm where Bm was 3527 G) was 0.872, the sheet OR was 3.39, the sheet SFD was 0.476, ΔBm was 3.4% (measured value—3.4%). In the orientation magnetic field of 238.7 KA/m (3 kOe), the sheet Hc was 116.3 KA/m (1462 Oe), the sheet squareness (Br/Bm where Bm is 3438 G) was 0.863, the sheet OR was 3.27, the sheet SFD was 0.493 and ΔBm was 3.5% (measured value—3.5%).

Preferred Embodiment 2

(Production of the Spindle-shaped Goethite Particles and Spindle-shaped Hematite Particles)

The spindle-shaped goethite particles and spindle-shaped hematite particles were prepared respectively in the same manner as in Embodiment 1 above.

(Production of the Spindle-shaped Magnetic Iron-based Alloy Particles)

These spindle-shaped hematite particles having an outermost layer consisting of the Nd compound were introduced into a fixed-bed reduction apparatus so as to form a bed of 7 cm in height, and an $H_2$ gas at 480° C. was passed therethrough at a superficial velscity of 70 cm/s, and then the particles were heated at a heating-up rate of 20° C./min until the reduction temperature rises to 480° C. and then heat-reduced. Thereafter, the atmosphere was exchanged with a nitrogen gas and cooled to 70° C., and then while steam was passed therethrough, the partial pressure of oxygen was gradually increased until it reached the same ratio as in the air, whereby a stable oxidized film was formed on the surface of the particles.

A part of the resulting spindle-shaped magnetic iron-based alloy particles was taken from a lower part (a part of 2 cm or lower in bed height) and an upper part (a part of 5 cm or higher) of the bed respectively, and the magnetic characteristics and crystallite sizes thereof were examined separately from the remaining particles.

The resulting magnetic iron-based alloy particles containing Co, Al and Nd comprised particles having an average major axis diameter of 0.180 μm, σ (standard deviation) of 0.0422 μm, a size distribution (standard deviation/major axis diameter) of 0.234, an average minor axis diameter of 0.0230 μm, an aspect ratio of 7.8, a BET specific surface area of 43.4 m²/g and a D110 (X-ray crystal particle diameter) of 155 Å, and the particles were spindle-shaped having a uniform particle size with less dendritic particles. In the particles, the Co content was 5 atom % based on the total Fe, the Al content was 8 atom % based on the total Fe, and the Nd content was 3 atom % based on the total Fe, wherein the ratio of Al/Nd was 2.67. As to the magnetic characteristics of the spindle-shaped magnetic iron-based alloy particles, the coercive force (Hc) was 123.5 KA/m (1552 Oe), the saturation magnetization (σs) was 130.0 Am²/kg (130.0 emu/g), the squareness (σr/σs) was 0.502, the absolute value of the oxidation stability (Δσs) of saturation magnetization was 4.5% (measured value—4.5%), and the ignition temperature was 156° C.

As to the sheet characteristics thereof in the orientation magnetic field of 397.9 KA/m (5 kOe), the sheet Hc was 118.3 KA/m (1486 Oe), the sheet squareness (Br/Bm) was 0.875, the sheet OR was 3.45, the sheet SFD was 0.470, and ΔBm was 3.0% (measured value—3.0%). In the orientation magnetic field of 238.7 KA/m (3 kOe), the sheet Hc was 117.8 KA/m (1480 Oe), the sheet squareness (Br/Bm) was 0.866, the sheet OR was 3.34, the sheet SFD was 0.485 and ΔBm was 2.8% (measured value—2.8%).

The spindle-shaped magnetic iron-based alloy particles taken from the lower part of the bed had a coercive force (Hc) of 124,2 KA/m (1561 Oe), a saturation magnetization (σs) of 129.6 Am²/kg (129.6 emu/g), a squareness (σr/σs) of 0.503 and a D110 (X-ray particle size) of 153 Å. On the other hand, the spindle-shaped magnetic iron-based alloy particles taken from the upper part of the bed had a coercive force (Hc) of 122.9 KA/m (1545 Oe), a saturation magnetization (σs) of 130.8 Am²/kg (130.8 emu/g), a squareness (σr/σs) of 0.501 and a D110 (X-ray particle size) of 156 Å.

Heretofore, additions of various metallic salts have been attempted to improve the shape, etc. of spindle-shaped goethite particles as the starting material of magnetic iron-based alloy particles. In particular, Co is known to form a solid solution with iron in forming magnetic iron-based alloy particles and to have a function of increasing magnetization and raising the coercive force Hc.

On the other hand, it is known that upon formation of a solid solution with Co in the reaction of forming spindle-shaped goethite particles, fine particles are obtained and their small particle size in the direction of the minor axis of the particle provides the goethite particles with a suitably large aspect ratio.

Accordingly, the present inventors examined in detail the function of Co in the reaction of forming spindle-shaped goethite, and as a result, they found that when Co is to be added at an aging stage, Co is added at a stage within ½ of the whole aging time while the superficial velocity is suitably regulated, whereby the minor axis diameter of the particles can be increased and the aspect ratio can be relatively reduced, and further that these spindle-shaped goethite particles are converted into magnetic iron-based alloy particles to form a coating film, whereby the squareness and orientation thereof are significantly improved.

Although the spindle-shaped goethite particles as the starting material have a large minor axis diameter and a relatively small aspect ratio, the squareness and orientation of the resulting magnetic iron-based alloy particles in a coating film are excellent, and as a reason for this, it is considered that the growth on each crystal face after formation of the surface layer particles is different from the growth on each crystal face (D020, D110) of the seed crystal particles of spindle-shaped goethite particles, the D020/D110 is 1.8 to 2.4, the minor axis diameter is large, and the aspect ratio is relatively low, and these features bring about very excellent sintering preventing properties upon heat treatment and heat reduction for conversion thereof into magnetic iron-based alloy particles, thus effectively preventing the destruction of shape.

As a result of their extensive study on heat treatment before heat reduction from the viewpoint of sintering preventing performance, the present inventors found that a coating film of spindle-shaped magnetic iron-based alloy particles exhibits a high squareness, high orientation and a low coercive force distribution only when the relationship of crystallite size between the D110 face of the spindle-shaped goethite particles as the starting material and the D104 face of the resulting spindle-shaped hematite particles is in the range of 0.9 to 1.1 as D104/D110 (goethite).

The present inventors have estimated that the reason that the high squareness, high orientation and low coercive force distribution in the form of a coating film are brought about by defining the proportion of growth from the spindle-shaped goethite particles to spindle-shaped hematite particles in specific crystal faces is that the resulting spindle-shaped hematite particles have a specific crystallite size ratio (D110/D104 is 2.0 to 4.0) and further the grown crystals of spindle-shaped hematite particles in heat treatment have a crystallite size capable of regulating the reduction rate suitably, effectively preventing sintering during reduction and not permitting excessive growth of the particles exceeding define particle size, thereby minimizing occurrence of sintering and destruction of shape in heat treatment.

Further, the present inventors examined the ratio of Al to a rare earth element, and as a result they found that when Al/rare earth element is in the range of 1.5 to 5, the resulting magnetic iron-based based alloy particles are excellent in oxidation stability and very excellent in ignition temperature. The reason is not clear but it is estimated that this element is considered to form an outermost layer of metal magnetic particles mainly as oxides to achieve an optimum composition having the advantages of both Al and the rare earth element where Al has a higher oxidation preventing effect with time as an oxide coating film than that of the rare earth element while the very stable rare earth element is more stable to heat as oxides than Al.

With a completely different idea from the prior art, the particles, though being spindle-shaped, are designed as described above to have a larger minor axis diameter and a relatively lower aspect ratio and to exhibit the maximum sintering preventing effect in each heat treatment step and further the ratio of Al to a rare earth element is specifically defined, whereby spindle-shaped magnetic iron-based alloy particles maintaining the coercive force and being excellent in the particle size distribution, free of dendritic particles and excellent in oxidation stability and in ignition temperature can be obtained, and when the resulting magnetic iron-based alloy particles are formed into a coating material with a binder resin having sodium sulfonate as a functional group, the coating exhibits improved squareness and orientation as coating film characteristics even in a low magnetic field and further is excellent in the coercive force distribution and in weatherability, thereby completing the present invention.

In addition, the present inventors found that reduction conditions are specifically defined, that is, the bed height is reduced as a whole to eliminate a partial delay in heating rate in the bed, a reducing gas is used during heating, and the gas superficial velocity and heating rate thereof are specified, whereby the reduction proceeds uniformly in the whole of the bed, and as a result, the magnetic iron-based alloy particles of superior qualities as a whole without any difference in qualities between upper and lower parts of the bed can be obtained.

Hereinafter, the present invention is described in more detail by reference to the Examples and Comparative Examples, which however are not intended to limit the scope of the present invention.

EXAMPLES 1 TO 5

Comparative Examples 1 to 3
<Production of Spindle-Shaped Particle Powder>

Spindle-shaped particles were obtained in the same manner as in Embodiment 1 above except that the conditions for formation of spindle-shaped goethite particles, that is, the conditions for the reaction of forming goethite seed crystal particles and the conditions for growth reaction thereof were varied as shown in Tables 1 and 2. The properties of the resulting spindle-shaped goethite particles are shown in Table 3.

Figure 4:
FIG. 4 is a transmission electron micrograph (×30000) of the particle structure of the spindle-shaped goethite particles obtained in Example 5.

An electron micrograph showing the shape of the spindle-shaped goethite particles obtained in Example 5 is shown in FIG. 4.

Comparative Example 1

Figure 7:
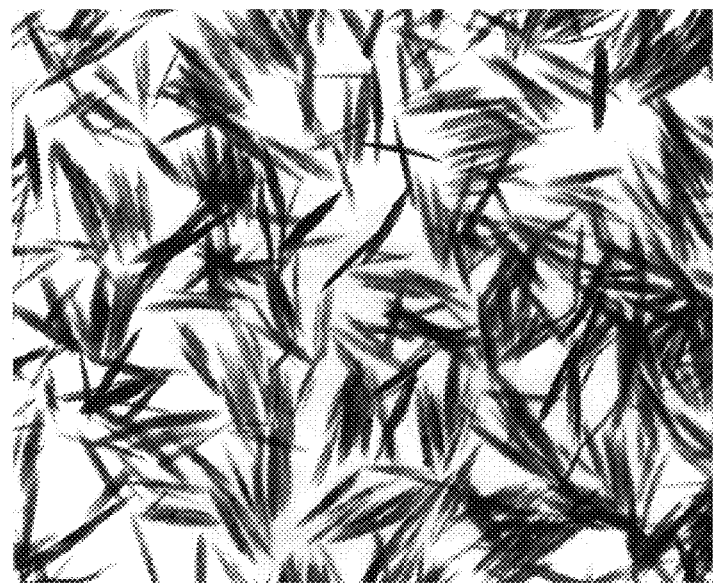
FIG. 7 is a transmission electron micrograph (×30000) of the particle structure of the spindle-shaped goethite particles obtained in Comparative Example 1.

The properties of goethite particles obtained in a method described in Example 2 in Japanese Patent Application Laid-Open (KOKAI) No. 10-245233 are shown in Table 3. The resulting goethite particles are shown in the transmission electron micrograph in FIG. 7. The aspect ratio of the resulting goethite particles was as large as more than 13, and the size distribution was poor. The growth of the goethite layer as the surface layer was different from that of the seed crystal particles, and the crystallite size ratio of D020/D110 was less than 1.8.

Comparative Example 2

The reaction of forming goethite particles was conducted in the same manner as in the Embodiment 1 except that Co was added after ½ of the whole aging time elapsed, and that the superficial velocity for passage of air was changed. The aspect ratio of the resulting goethite particles was less than 5 and the size distribution was poor.

Comparative Example 3

The reaction of forming goethite particles was conducted in the same manner as in the Embodiment 1 except that Al was added at a content of 12 atom %. The resulting goethite particles were those having a specific surface area of more than 160 m²/g.

TABLE 1

Formation reaction of goethite seed particles

| Ex. and C. Ex. | Alkali mixture aq. sol. | | | | | Ferrous salt aq. sol. | | |
|---|---|---|---|---|---|---|---|---|
| | Alkali carbonate aq. sol. | | Alkali hydroxide aq. sol. | | Alkali ratio (1) (%) | | | Eq. ratio (2) |
| | Kind | Amount (mol) | Kind | Amount (mol) | | Kind | Amount (mol) | |
| Ex. 1 | Na$_2$CO$_3$ | 25 | NaOH | 19 | 27.5 | FeSO$_4$ | 20 | 1.725 |
| Ex. 2 | Na$_2$CO$_3$ | 25 | NaOH | 19 | 27.5 | FeSO$_4$ | 20 | 1.725 |
| Ex. 3 | Na$_2$CO$_3$ | 25 | NaOH | 19 | 27.5 | FeSO$_4$ | 20 | 1.725 |
| Ex. 4 | Na$_2$CO$_3$ | 25 | NaOH | 19 | 27.5 | FeSO$_4$ | 20 | 1.725 |
| Ex. 5 | Na$_2$CO$_3$ | 25 | NaOH | 19 | 27.5 | FeSO$_4$ | 20 | 1.725 |
| C. Ex. 1 | Process in Ex. 2 of Jap. Pat. Appln. Laid-Open (Kokai) No. 10-245233 | | | | | | | |
| C. Ex. 2 | Na$_2$CO$_3$ | 25 | NaOH | 19 | 27.5 | FeSO$_4$ | 20 | 1.725 |
| C. Ex. 3 | Na$_2$CO$_3$ | 25 | NaOH | 19 | 27.5 | FeSO$_4$ | 20 | 1.725 |

Formation reaction of goethite seed particles

| Ex. and C. Ex. | Aging | | | Co compound | | | | Superficial velocity of air (cm/s) | Temp. (°C.) |
|---|---|---|---|---|---|---|---|---|---|
| | Temp. (°C.) | Time (Hr.) | Superficial velocity of N$_2$ gas (cm/s) | Kind | Amount (mol) | Add. period After initiation of aging (Hr.) | Add. of Co/total aging time (—) | | |
| Ex. 1 | 46 | 5 | 2.30 | CoSO$_4$ | 0.4 | 1.0 | 0.2 | 1.70 | 46 |
| Ex. 2 | 47 | 5 | 2.20 | CoSO$_4$ | 0.8 | 0.5 | 0.1 | 1.50 | 47 |
| Ex. 3 | 48 | 5 | 2.30 | CoSO$_4$ | 1.5 | 0.5 | 0.1 | 1.40 | 48 |
| Ex. 4 | 48 | 5 | 2.30 | CoSO$_4$ | 1.5 | 0.5 | 0.1 | 1.50 | 48 |
| Ex. 5 | 46 | 5 | 2.50 | CoSO$_4$ | 1.4 | 2.0 | 0.4 | 1.80 | 46 |
| C. Ex. 1 | Process in Ex. 2 of Jap. Pat. Appln. Laid-Open (Kokai) No. 10-245233 | | | | | | | | |
| C. Ex. 2 | 47 | 5 | 2.20 | CoSO$_4$ | 1.0 | 4.0 | 0.8 | 0.75 | 47 |
| C. Ex. 3 | 47 | 5 | 2.20 | CoSO$_4$ | 1.0 | 0.5 | 0.1 | 1.50 | 47 |

(1) (½ alkali hydroxide)/(Total alkali) (Total alkali is calculated from ½ alkali hydroxide + alkali carbonate.)
(2) Total alkali/Fe$^{2+}$ (Total alkali is calculated from ½ alkali hydroxide + alkali carbonate.)

TABLE 2

Formation reaction of goethite seed particles

| Ex. and C. Ex. | Al compound | | | |
|---|---|---|---|---|
| | Kind | Add. amount (mol) | Fe$^{2+}$ Ox. ratio (%) | Superficial velocity of air (cm/s) |
| Ex. 1 | Al sulfate | 1.5 | 45 | 2.50 |
| Ex. 2 | Al sulfate | 1.6 | 50 | 2.50 |
| Ex. 3 | Al sulfate | 1.8 | 45 | 2.30 |
| Ex. 4 | Al sulfate | 1.4 | 40 | 2.50 |
| Ex. 5 | Al sulfate | 1.4 | 40 | 2.50 |
| C. Ex. 1 | Process in Ex. 2 of Jap Pat Appln. Laid-Open (Kokai) No. 10-245233 | | | |
| C. Ex. 2 | Al sulfate | 1.6 | 40 | 2.30 |
| C. Ex. 3 | Al sulfate | 2.4 | 40 | 2.30 |

TABLE 3

Characteristics of goethite particles

| Ex. and C. Ex. | Shape | Av. major axis dia. l (μm) | St. dev. σ (μm) | Size distr. σ/l | Av. minor axis dia. (μm) | Aspect ratio | BET sp. surface area (m$^2$/g) | Comp. of whole particles | | Crystallite size | | | | Crystallite size ratio | | |
|---|---|---|---|---|---|---|---|---|---|---|---|---|---|---|---|---|
| | | | | | | | | Co cont. Co/Fe (atom %) | Al cont. Al/Fe (atom %) | Crystallite of seed particles D020(l) (Å) | | Crystallite of whole particles D020 (Å) | D110 (Å) | D020/ D110 | D020/ D020(l) | D110/ D110(l) |
| | | | | | | | | | | D020(l) (Å) | D110(l) (Å) | | | | | |
| Ex. 1 | Spindle | 0.285 | 0.0499 | 0.175 | 0.0335 | 8.5 | 128.9 | 2.0 | 7.5 | 244 | 131 | 268 | 139 | 1.93 | 1.10 | 1.06 |
| Ex. 2 | Spindle | 0.271 | 0.0439 | 0.162 | 0.0393 | 6.9 | 133.1 | 4.0 | 8.0 | 240 | 127 | 261 | 133 | 1.96 | 1.09 | 1.05 |

TABLE 3-continued

Characteristics of goethite particles

| Ex. and C. Ex. | Shape | Av. major axis dia. l (μm) | St. dev. σ (μm) | Size distr. σ/l | Av. minor axis dia. (μm) | Aspect ratio | BET sp. surface area (m²/g) | Comp. of whole particles Co cont. Co/Fe (atom %) | Comp. of whole particles Al cont. Al/Fe (atom %) | Crystallite size Crystallite of seed particles D020(l) (Å) | Crystallite size Crystallite of seed particles D110(l) (Å) | Crystallite size Crystallite of whole particles D020 (Å) | Crystallite size Crystallite of whole particles D110 (Å) | Crystallite size ratio D020/D110 | Crystallite size ratio D020/D020(l) | Crystallite size ratio D110/D110(l) |
|---|---|---|---|---|---|---|---|---|---|---|---|---|---|---|---|---|
| Ex. 3 | Spindle | 0.226 | 0.0350 | 0.155 | 0.0370 | 6.1 | 144.8 | 7.5 | 9.0 | 241 | 107 | 251 | 109 | 2.30 | 1.04 | 1.02 |
| Ex. 4 | Spindle | 0.193 | 0.0320 | 0.166 | 0.0308 | 6.3 | 149.8 | 7.5 | 7.0 | 199 | 102 | 224 | 112 | 2.00 | 1.13 | 1.10 |
| Ex. 5 | Spindle | 0.188 | 0.0297 | 0.158 | 0.0276 | 6.8 | 147.5 | 7.0 | 7.5 | 187 | 99 | 215 | 108 | 1.99 | 1.15 | 1.09 |
| C. Ex. 1 | Spindle | 0.327 | 0.0736 | 0.225 | 0.0236 | 13.9 | 92.5 | 3.9 | 6.0 | 240 | 117 | 242 | 140 | 1.73 | 1.01 | 1.20 |
| C. Ex. 2 | Spindle | 0.269 | 0.0603 | 0.224 | 0.0560 | 4.8 | 105.3 | 5.0 | 8.0 | 279 | 146 | 282 | 164 | 1.72 | 1.01 | 1.12 |
| C. Ex. 3 | Spindle | 0.248 | 0.0491 | 0.198 | 0.0365 | 6.8 | 162.9 | 5.0 | 12.0 | 245 | 125 | 259 | 128 | 2.02 | 1.06 | 1.02 |

EXAMPLES 6 TO 10

Comparative Examples 4 to 10
<Production of Spindle-Shaped Hematite Particles>

Spindle-shaped hematite particles were obtained in the same manner as in the Embodiment 1 except that the spindle-shaped goethite particles obtained in Examples 1 to 5 and Comparative Examples 1 to 3 above were used, and that the kind and amount of a coating material used in sintering preventing treatment, the temperature for heat dehydration and the temperature for subsequent heat treatment were varied. The manufacturing conditions are shown in Table 4, and the properties of the resulting spindle-shaped hematite particles are shown in Table 5.

Figure 5:
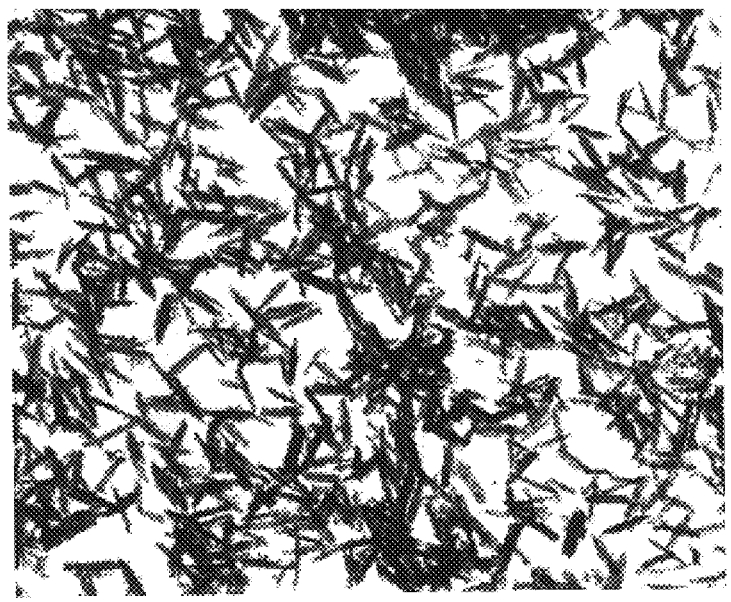
FIG. 5 is a transmission electron micrograph (×30000) of the particle structure of the spindle-shaped hematite particles obtained in Example 10.

A transmission electron micrograph showing the shape of the spindle-shaped hematite particles obtained in Example 10 is shown in FIG. 5.

Figure 8:
FIG. 8 is a transmission electron micrograph (×30000) of the particle structure of the spindle-shaped hematite particles obtained in Comparative Example 4.

Comparative Example 4 followed the method described in Example 2 in Japanese Patent Application Laid-Open (KOKAI) No. 10-245233. The resulting hematite particles had an aspect ratio of not less than 12, and the size distribution was poor, the ratio of D104 to D110 of goethite exceeded 1.1, and the crystallite size ratio of D110/D104 was less than 2.0. A transmission electron micrograph showing the shape of the resulting hematite particles is shown in FIG. 8.

Comparative Example 5 was conducted in the same manner as in the Embodiment 1. The resulting hematite particles had an aspect ratio of less than 5, and the size distribution was poor, Further, the crystallite size ratio of D110/D104 was less than 2.0.

Comparative Example 6 was conducted in the same manner as in the Embodiment 1, The resulting hematite particles had a specific surface area of more than 70 m²/g and the crystallite size ratio of D110/D104 was less than 2.0.

Comparative Example 7 was conducted in the same manner as in Example 6 except that the goethite particles obtained in Example 1 were used and that Nd was added at a content of 6.0 atom %. The ratio of Al/rare earth element in the resulting hematite particles was less than 1.5.

Comparative Example 8 was conducted in the same manner as in Example 7 except that the goethite particles obtained in Example 2 were used and that Y was added at a content of 1.5 atom %. The ratio of Al/rare earth element in the resulting hematite particles was more than 5.0.

In Comparative Example 9, the goethite particles obtained in Example 4 were used, and similarly to Example 9, Nd and Co were added, and the temperature for heat dehydration was changed. The specific surface area of the resulting hematite particles was very large and the ratio of D104 to D110 of goethite was less than 0.9, and the crystallite size ratio of D110/D104 exceeded 4.0.

In Comparative Example 10, the goethite particles obtained in Example 4 were used, and similarly to Example 9, Nd and Co were added, and the temperature for heat dehydration was changed, The resulting hematite particles are poor in size distribution, and the ratio of D104 to D110 of goethite exceeded 1.1, and the crystallite size ratio of D110/D104 was less-than 2.0.

TABLE 4

| Ex. and C. Ex. | Ex. or C. Ex. No. of goethite particles used | Production conditions of hematite particles Sintering prevention Agent Kind of rare earth comp. | Production conditions of hematite particles Sintering prevention Add. amount (Re/Fe) (atom %) | Production conditions of hematite particles Additive Co (Co/Fe) (atom %) | Production conditions of hematite particles Additive Al (Al/Fe) (atom %) | Production conditions of hematite particles Heat treatment Heating temp. (° C.) | Production conditions of hematite particles Heat treatment Atmosphere |
|---|---|---|---|---|---|---|---|
| Ex. 6 | Ex. 1 | Neodymium nitrate | 1.6 | 0.0 | 0.0 | 770 | Air |
| Ex. 7 | Ex. 2 | Yttrium nitrate | 4.0 | 0.0 | 0.0 | 730 | Air |
| Ex. 8 | Ex. 3 | Yttrium nitrate | 4.5 | 0.0 | 0.0 | 680 | Air |
| Ex. 9 | Ex. 4 | Neodymium nitrate | 4.5 | 2.0 | 0.0 | 660 | Air |
| Ex. 10 | Ex. 5 | Neodymium nitrate | 5.0 | 2.5 | 0.0 | 650 | Air |
| C. Ex. 4 | C. Ex. 1 | Neodymium nitrate | 1.5 | 0.0 | 2.0 | 810 | Air |
| C. Ex. 5 | C. Ex. 2 | Neodymium nitrate | 3.0 | 0.0 | 0.0 | 730 | Air |

TABLE 4-continued

| | Ex. or C. | Production conditions of hematite particles | | | | | |
|---|---|---|---|---|---|---|---|
| | Ex. No. of | Sintering prevention | | Additive | | Heat treatment | |
| Ex. and C. Ex. | goethite particles used | Agent Kind of rare earth comp. | Add. amount (Re/Fe) (atom %) | Co (Co/Fe) (atom %) | Al (Al/Fe) (atom %) | Heating temp. (° C.) | Atmosphere |
| C. Ex. 6 | C. Ex. 3 | Neodymium nitrate | 3.0 | 0.0 | 0.0 | 730 | Air |
| C. Ex. 7 | Ex. 1 | Neodymium nitrate | 6.0 | 0.0 | 0.0 | 770 | Air |
| C. Ex. 8 | Ex. 2 | Yttrium nitrate | 1.5 | 0.0 | 0.0 | 730 | Air |
| C. Ex. 9 | Ex. 4 | Neodymium nitrate | 4.5 | 2.0 | 0.0 | 330 | Air |
| C. Ex. 10 | Ex. 4 | Neodymium nitrate | 4.5 | 2.0 | 0.0 | 850 | Air |

TABLE 5

| | Ex. or C. | Characteristics of hematite particles | | | | | | |
|---|---|---|---|---|---|---|---|---|
| Ex. and C. Ex. | Ex. No. of goethite particles used | Shape | Av. major axis dia. l (μm) | St. dev. σ (μm) | Size distr. σ/l | Av. minor axis dia. (μm) | Aspect ratio | BET sp. surface area (m²/g) |
| Ex. 6 | Ex. 1 | Spindle | 0.250 | 0.0468 | 0.187 | 0.0309 | 8.1 | 44.8 |
| Ex. 7 | Ex. 2 | Spindle | 0.243 | 0.0430 | 0.177 | 0.0316 | 7.7 | 47.9 |
| Ex. 8 | Ex. 3 | Spindle | 0.183 | 0.0300 | 0.164 | 0.0269 | 6.8 | 58.9 |
| Ex. 9 | Ex. 4 | Spindle | 0.179 | 0.0328 | 0.183 | 0.0252 | 7.7 | 59.2 |
| Ex. 10 | Ex. 5 | Spindle | 0.176 | 0.0315 | 0.179 | 0.0226 | 7.8 | 63.7 |
| C. Ex. 4 | C. Ex. 1 | Spindle | 0.297 | 0.0719 | 0.242 | 0.0234 | 12.7 | 40.2 |
| C. Ex. 5 | C. Ex. 2 | Spindle | 0.237 | 0.0628 | 0.265 | 0.0504 | 4.7 | 33.1 |
| C. Ex. 6 | C. Ex. 3 | Spindle | 0.221 | 0.0438 | 0.198 | 0.0295 | 7.5 | 72.5 |
| C. Ex. 7 | Ex. 1 | Spindle | 0.260 | 0.0494 | 0.190 | 0.0317 | 8.2 | 54.2 |
| C. Ex. 8 | Ex. 2 | Spindle | 0.221 | 0.0413 | 0.187 | 0.0295 | 7.5 | 41.9 |
| C. Ex. 9 | Ex. 4 | Spindle | 0.191 | 0.0336 | 0.176 | 0.0242 | 7.9 | 123.3 |
| C. Ex. 10 | Ex. 4 | Spindle | 0.165 | 0.0365 | 0.221 | 0.0226 | 7.3 | 44.8 |

| | Characteristics of hematite particles | | | | | | | | |
|---|---|---|---|---|---|---|---|---|---|
| | Comp. of whole particles | | | | | | | Goethite crystallite | Size ratio of goethite and |
| Ex. and C. Ex. | Co cont. Co/Fe (atom %) | Al cont. Al/Fe (atom %) | Cont. of rare earth elem. Re/Fe (atom %) | Elem. ratio Al/rare earth | Crystallite D104 (Å) | Crystallite D110 (Å) | Crystallite size ratio D110/D104 | D110 (g) (Å) | hematite D104/D110 (g) |
| Ex. 6 | 2.0 | 7.5 | 1.6 | 4.69 | 131 | 299 | 2.28 | 139 | 0.94 |
| Ex. 7 | 4.0 | 8.0 | 4.0 | 2.00 | 131 | 288 | 2.20 | 133 | 0.98 |
| Ex. 8 | 7.5 | 9.0 | 4.5 | 2.00 | 111 | 248 | 2.23 | 109 | 1.02 |
| Ex. 9 | 9.5 | 7.0 | 4.5 | 1.56 | 109 | 251 | 2.30 | 112 | 0.97 |
| Ex. 10 | 9.5 | 7.5 | 5.0 | 1.50 | 105 | 248 | 2.36 | 108 | 0.97 |
| C. Ex. 4 | 3.9 | 10.0 | 1.5 | 6.67 | 157 | 258 | 1.64 | 140 | 1.12 |
| C. Ex. 5 | 5.0 | 8.0 | 3.0 | 2.67 | 160 | 303 | 1.89 | 164 | 0.98 |
| C. Ex. 6 | 5.0 | 12.0 | 3.0 | 4.00 | 126 | 249 | 1.98 | 128 | 0.98 |
| C. Ex. 7 | 2.0 | 7.5 | 6.0 | 1.25 | 123 | 274 | 2.28 | 139 | 0.92 |
| C. Ex. 8 | 4.0 | 8.0 | 1.5 | 5.33 | 140 | 299 | 2.13 | 133 | 1.05 |
| C. Ex. 9 | 9.5 | 7.0 | 4.5 | 1.56 | 44 | 183 | 4.15 | 112 | 0.39 |
| C. Ex. 10 | 9.5 | 7.0 | 4.5 | 1.56 | 144 | 260 | 1.81 | 112 | 1.28 |

EXAMPLES 11 TO 15

Comparative Examples 11 to 17

<Production of Magnetic Iron-Based Alloy Particles>

Magnetic iron-based alloy particles were obtained in the same manner as in the Embodiment 1 except that the spindle-shaped hematite particles obtained in Examples 6 to 10 and Comparative Examples 4 to 10 above were used as particles to be treated, and also that the kind and amount of a coating material used in sintering preventing treatment, the heating temperature, the temperature for reduction in the heat reduction step were varied. The reduction conditions and the properties of the resulting magnetic iron-based alloy particles are shown in Table 6, and the properties thereof in the form of a magnetic coating film are shown Table 7.

Figure 6:
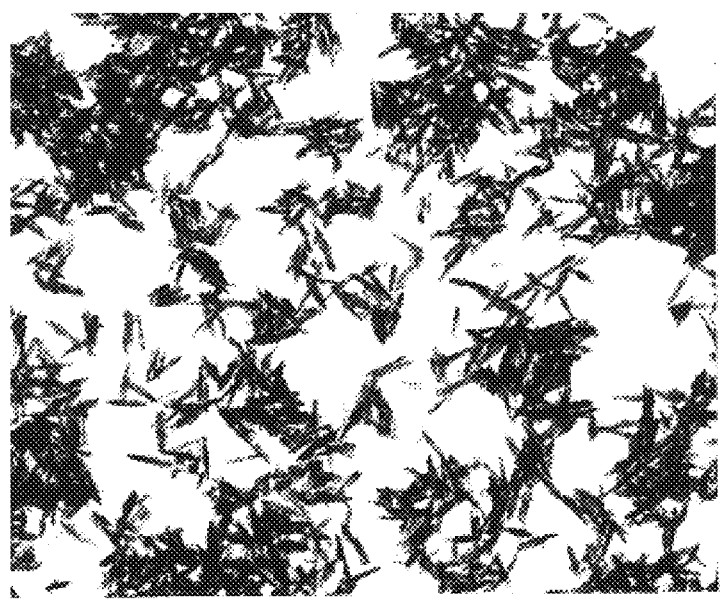
FIG. 6 is a transmission electron micrograph (×30000) of the particle structure of the spindle-shaped magnetic iron-based alloy particles obtained in Example 15.

A transmission electron micrograph showing the shape of the spindle-shaped magnetic iron-based alloy particles obtained in Example 15 is shown in FIG. 6.

Figure 9:
FIG. 9 is a transmission electron micrograph (×30000) of the particle structure of the spindle-shaped magnetic iron-based alloy particles obtained in Comparative Example 11.

A transmission electron micrograph showing the shape of the magnetic iron-based alloy particles obtained in Comparative Example 11 is shown in FIG. 9.

Comparative Example 11 followed the method described in Example 2 in Japanese Patent Application Laid-Open (KOKAI) No. 10-245233.

TABLE 6

Characteristics of magnetic iron-based alloy particles

| Ex. and C. Ex. | Ex. or C. Ex. No. of hematite particles used | Heat reduction Red. temp. (° C.) | Av. major axis dia. l (μm) | St. dev. σ (μm) | Size distr. σ/l | Av. minor axis dia. (μm) | Aspect ratio | BET sp. surface area (m²/g) | Crystallite size D110 (Å) | Co cont. Co/Fe (atom %) | Al cont. Al/Fe (atom %) | Cont. of rare earth elem. Re/Fe (atom %) | Elem. ratio Al/rare earth |
|---|---|---|---|---|---|---|---|---|---|---|---|---|---|
| Ex. 11 | Ex. 6 | 450 | 0.183 | 0.0481 | 0.263 | 0.0232 | 7.9 | 40.5 | 156 | 2.0 | 7.5 | 1.6 | 4.69 |
| Ex. 12 | Ex. 7 | 490 | 0.180 | 0.0463 | 0.257 | 0.0233 | 7.7 | 42.9 | 151 | 4.0 | 8.0 | 4.0 | 2.00 |
| Ex. 13 | Ex. 8 | 420 | 0.158 | 0.0381 | 0.241 | 0.0247 | 6.4 | 48.9 | 144 | 7.5 | 9.0 | 4.5 | 2.00 |
| Ex. 14 | Ex. 9 | 410 | 0.153 | 0.0433 | 0.283 | 0.0199 | 7.7 | 48.8 | 145 | 9.5 | 7.0 | 4.5 | 1.56 |
| Ex. 15 | Ex. 10 | 410 | 0.151 | 0.0397 | 0.263 | 0.0199 | 7.6 | 49.6 | 147 | 9.5 | 7.5 | 5.0 | 1.50 |
| C. Ex. 11 | C. Ex. 4 | 500 | 0.188 | 0.0598 | 0.318 | 0.0174 | 10.8 | 50.1 | 153 | 3.9 | 10.0 | 1.5 | 6.67 |
| C. Ex. 12 | C. Ex. 5 | 480 | 0.171 | 0.0568 | 0.332 | 0.0349 | 4.9 | 33.1 | 182 | 5.0 | 8.0 | 3.0 | 2.67 |
| C. Ex. 13 | C. Ex. 6 | 480 | 0.176 | 0.0549 | 0.312 | 0.0235 | 7.5 | 61.9 | 148 | 5.0 | 12.0 | 3.0 | 4.00 |
| C. Ex. 14 | C. Ex. 7 | 450 | 0.184 | 0.0570 | 0.310 | 0.0230 | 8.0 | 53.8 | 146 | 2.0 | 7.5 | 6.0 | 1.25 |
| C. Ex. 15 | C. Ex. 8 | 490 | 0.179 | 0.0564 | 0.315 | 0.0242 | 7.4 | 37.9 | 163 | 4.0 | 8.0 | 1.5 | 5.33 |
| C. Ex. 16 | C. Ex. 9 | 410 | 0.151 | 0.0616 | 0.408 | 0.0213 | 7.1 | 46.8 | 161 | 9.5 | 7.0 | 4.5 | 1.56 |
| C. Ex. 17 | C. Ex. 10 | 410 | 0.151 | 0.0467 | 0.309 | 0.0204 | 7.4 | 44.3 | 158 | 9.5 | 7.0 | 4.5 | 1.56 |

TABLE 7

| Ex. and C. Ex. | Ex. or C. Ex. No. of hematite particles used | Characteristics of magnetic iron-based alloy particles | | | | |
|---|---|---|---|---|---|---|
| | | *Coercive force Hc (KA/m) (Oe) | Sat. magnetization σs (Am²/Kg = emu/g) | Squareness σr/σs | Δ σs (%) | Ignition temp. (° C.) |
| Ex. 11 | Ex. 6 | 118.7 / 1491 | 122.8 | 0.498 | 5.6 | 151 |
| Ex. 12 | Ex. 7 | 122.8 / 1543 | 130.2 | 0.500 | 4.8 | 154 |
| Ex. 13 | Ex. 8 | 129.8 / 1631 | 132.8 | 0.503 | 5.9 | 147 |
| Ex. 14 | Ex. 9 | 132.5 / 1665 | 134.0 | 0.502 | 6.1 | 149 |
| Ex. 15 | Ex. 10 | 134.6 / 1692 | 133.1 | 0.504 | 6.2 | 151 |
| Co. Ex. 11 | Co. Ex. 4 | 123.7 / 1555 | 145.2 | 0.505 | 12.5 | 120 |
| Co. Ex. 12 | Co. Ex. 5 | 111.5 / 1401 | 136.5 | 0.481 | 11.2 | 127 |
| Co. Ex. 13 | Co. Ex. 6 | 116.0 / 1458 | 120.8 | 0.489 | 10.2 | 128 |
| Co. Ex. 14 | Co. Ex. 7 | 115.8 / 1455 | 118.8 | 0.493 | 11.0 | 124 |
| Co. Ex. 15 | Co. Ex. 8 | 118.6 / 1490 | 133.8 | 0.485 | 7.9 | 133 |
| Co. Ex. 16 | Co. Ex. 9 | 115.9 / 1457 | 135.5 | 0.492 | 7.7 | 131 |
| Co. Ex. 17 | Co. Ex. 10 | 126.4 / 1588 | 136.1 | 0.494 | 8.1 | 133 |

| Ex. and C. Ex. | Characteristics of magnetic coating film (orientation magnetic field 397.9 KA/m = 5 KOe) | | | | | Characteristics of magnetic coating film (orientation magnetic field 238.7 KA/m = 3 KOe) | | | | |
|---|---|---|---|---|---|---|---|---|---|---|
| | *Coercive force Hc (KA/m) (Oe) | Sat. magnetic flux density Bm (G) | Squareness Br/Bm | OR | SFD | *Coercive force Hc (KA/m) (Oe) | Sat. magnetic flux density Bm (G) | Squareness Br/Bm | OR | SFD |
| | | | | | Δ Bm (%) | | | | | |
| Ex. 11 | 113.2 / 1423 | 3341 | 0.862 | 3.21 | 0.487 3.9 | 112.7 / 1416 | 3326 | 0.855 | 3.16 | 0.504 |
| Ex. 12 | 117.5 / 1477 | 3587 | 0.871 | 3.44 | 0.479 3.7 | 116.4 / 1463 | 3444 | 0.861 | 3.33 | 0.494 |
| Ex. 13 | 125.7 / 1580 | 3610 | 0.866 | 3.18 | 0.483 4.5 | 124.3 / 1562 | 3439 | 0.859 | 3.04 | 0.499 |
| Ex. 14 | 127.4 / 1601 | 3558 | 0.866 | 3.19 | 0.478 4.2 | 126.5 / 1590 | 3449 | 0.856 | 3.08 | 0.495 |
| Ex. 15 | 131.4 / 1651 | 3607 | 0.868 | 3.28 | 0.480 4.3 | 130.3 / 1638 | 3501 | 0.859 | 3.20 | 0.494 |
| Co. Ex. 11 | 116.6 / 1465 | 3459 | 0.848 | 2.88 | 0.488 11.1 | 114.8 / 1443 | 3310 | 0.819 | 2.62 | 0.522 |

TABLE 7-continued

| | | | | | | | | | | |
|---|---|---|---|---|---|---|---|---|---|---|
| Co. Ex. 12 | 110.6 1390 | 3402 | 0.802 | 2.33 | 0.583 | 9.8 | 109.7 1378 | 3388 | 0.786 | 2.14 | 0.604 |
| Co. Ex. 13 | 113.1 1421 | 3412 | 0.839 | 2.68 | 0.544 | 8.3 | 112.8 1417 | 3401 | 0.827 | 2.61 | 0.549 |
| Co. Ex. 14 | 112.2 1410 | 3288 | 0.841 | 2.81 | 0.537 | 8.9 | 111.6 1403 | 3219 | 0.829 | 2.68 | 0.542 |
| Co. Ex. 15 | 113.8 1430 | 3449 | 0.828 | 2.51 | 0.541 | 6.5 | 113.1 1421 | 3417 | 0.824 | 2.46 | 0.544 |
| Co. Ex. 16 | 114.4 1438 | 3330 | 0.801 | 2.21 | 0.589 | 6.1 | 113.2 1422 | 3322 | 0.789 | 2.17 | 0.608 |
| Co. Ex. 17 | 124.0 1558 | 3333 | 0.830 | 2.44 | 0.553 | 6.2 | 123.3 1550 | 3299 | 0.827 | 2.40 | 0.559 |

*Upper values (KA/m)
Lower values (Oe)

EXAMPLES 16 TO 26

(1) Production of Spindle-shaped Goethite Particles

According to Embodiment 2 above, spindle-shaped goethite particles 1 and 2 were obtained as shown in Table 8.

The properties of the resulting spindle-shaped goethite particles are shown in Table 8.

TABLE 8

| | Characteristics of goethite particles | | | | | | | |
|---|---|---|---|---|---|---|---|---|
| Starting particles | Av. major axis dia. ($\mu$m) | St. dev. ($\mu$m) | Size distr. (—) | Av. minor axis dia. ($\mu$m) | Aspect ratio (—) | BET sp. surface area ($m^2/g$) | Co cont. (atom %) | Al cont. (atom %) |
| Goethite particles 1 | 0.288 | 0.0499 | 0.173 | 0.0335 | 8.6 | 127.2 | 2.0 | 7.5 |
| Goethite particles 2 | 0.189 | 0.0298 | 0.158 | 0.0291 | 6.5 | 148.0 | 3.0 | 8.0 |

(2) Production of Spindle-shaped Hematite Particles

According to the Embodiment above, spindle-shaped hematite particles 1 and 2 were obtained as shown in Table 9.

That is, the spindle-shaped hematite particles were obtained in the same manner as in the Embodiment 2 except that the spindle-shaped goethite particles 1 and 2 obtained in (1) above were used, and that the kind and amount of a coating material used in sintering preventing treatment, the heat dehydration temperature, the temperature for subsequent heat treatment were varied. These manufacturing conditions are shown in Table 9 and the properties of the resulting spindle-shaped hematite particles are shown in Table 10.

TABLe 9

| Hematite particles | Starting material of hematite particles | Sintering prevention treatment | | Production conditions of hematite particles | |
|---|---|---|---|---|---|
| | | Rare earth comp. | | Dehyrdation | Heating |
| | | Kind | Comp. (atom %) | temp. (° C.) | temp. (° C.) |
| Hematite particles 1 | Goethite particles 1 | Nd(NO3)3 | 1.6 | 310 | 770 |
| Hematite particles 2 | Goethite particles 2 | Y(NO3)3 | 2.0 | 330 | 740 |

TABLE 10

| | Characteristics of hematite particles | | | | | | | | | | | | |
|---|---|---|---|---|---|---|---|---|---|---|---|---|---|
| | Av. major axis dia. ($\mu$m) | St. dev. ($\mu$m) | Size distr. (—) | Av. minor axis dia. ($\mu$m) | Aspect ratio (—) | BET sp. surface area ($m^2/g$) | Co cont. (atom %) | Al cont. (atom %) | Cont. of rare earth elem. (atom %) | Elem. ratio Al/rare earth (—) | Crystallite size (D110) (Å) | Crystallite size (D104) (Å) | Size ratio of crystallite (D110/D104) (—) |
| Hematite particles 1 | 0.252 | 0.0465 | 0.185 | 0.0307 | 8.2 | 44.3 | 2.0 | 7.5 | 1.6 | 4.69 | 300 | 131 | 2.29 |
| Hematite particles 2 | 0.178 | 0.0317 | 0.178 | 0.0234 | 7.6 | 50.5 | 3.0 | 8.0 | 2.0 | 4.00 | 275 | 115 | 2.39 |

(3) Production of Magnetic Iron-based Alloy Particles

The magnetic iron-based alloy particles were obtained in the same manner as in the Embodiment 2 except that the spindle-shaped hematite particles obtained in (2) above were used as particles to be treated, and that the bed height in the heat reduction step, the kind of the heating gas, the gas superficial velocity, the heating rate and the reduction temperature were varied. The reduction conditions in this process are shown in Table 11, the properties of the resulting magnetic iron-based alloy particles are shown in Table 12, the properties of the magnetic iron-based alloy particles from upper and lower parts of the bed are shown in Table 13, and the properties thereof in the form of a magnetic coating film are shown in Table 14.

TABLE 11

| Ex. and Co. Ex. | Hematite particles used | Reduction conditions | | | | | |
|---|---|---|---|---|---|---|---|
| | | Bed hight (cm) | Kind of gas upon heating up | Kind of reducing gas | Superficial velocity (cm/s) | Heating up speed (° C./min.) | Reducing temp. (° C.) |
| Ex. 16 | Hematite particles 1 | 4 | $H_2$ | $H_2$ | 60 | 30 | 460 |
| Ex. 17 | Hematite particles 1 | 12 | $H_2$ | $H_2$ | 140 | 25 | 440 |
| Ex. 18 | Hematite particles 2 | 5 | $H_2$ | $H_2$ | 120 | 25 | 450 |
| Ex. 19 | Hematite particles 1 | 7 | $H_2$ | $H_2$ | 40 | 20 | 430 |
| Ex. 20 | Hematite particles 2 | 6 | $H_2$ | $H_2$ | 100 | 70 | 440 |
| Ex. 21 | Hematite particles 1 | 14 | $H_2$ | $H_2$ | 70 | 20 | 460 |
| Ex. 22 | Hematite particles 1 | 7 | $N_2$ | $H_2$ | 50 | 20 | 430 |
| Ex. 23 | Hematite particles 1 | 4 | $H_2$ | $H_2$ | 60 | 5 | 460 |
| Ex. 24 | Hematite particles 1 | 12 | $H_2$ | $H_2$ | 140 | 100 | 440 |
| Ex. 25 | Hematite particles 2 | 6 | $H_2$ | $H_2$ | 20 | 40 | 440 |
| Ex. 26 | Hematite particles 2 | 20 | $H_2$ | $H_2$ | 100 | 40 | 440 |

TABLE 12

| EX. and C. Ex. | Characteristics of magnetic iron-based alloy particles | | | | | | | |
|---|---|---|---|---|---|---|---|---|
| | Av. major axis dia. (μm) | St. dev. (μm) | Size distr. (—) | Av. minor axis dia. (μm) | Aspect ratio (—) | Co cont. (atom %) | Al cont. (atom %) | Cont. of rare earth elem. (atom %) |
| Ex. 16 | 0.182 | 0.0422 | 0.232 | 0.0228 | 8.0 | 2.0 | 7.5 | 1.6 |
| Ex. 17 | 0.183 | 0.0432 | 0.236 | 0.0232 | 7.9 | 2.0 | 7.5 | 1.6 |
| Ex. 18 | 0.151 | 0.0361 | 0.239 | 0.0204 | 7.4 | 3.0 | 8.0 | 2.0 |
| Ex. 19 | 0.180 | 0.0430 | 0.239 | 0.0231 | 7.8 | 2.0 | 7.5 | 1.6 |
| Ex. 20 | 0.150 | 0.0362 | 0.241 | 0.0207 | 7.2 | 3.0 | 8.0 | 2.0 |
| Ex. 21 | 0.178 | 0.0429 | 0.241 | 0.0231 | 7.7 | 2.0 | 7.5 | 1.6 |
| Ex. 22 | 0.179 | 0.0482 | 0.269 | 0.0236 | 7.6 | 2.0 | 7.5 | 1.6 |
| Ex. 23 | 0.183 | 0.0485 | 0.265 | 0.0226 | 8.1 | 2.0 | 7.5 | 1.6 |
| Ex. 24 | 0.178 | 0.0486 | 0.273 | 0.0234 | 7.6 | 2.0 | 7.5 | 1.6 |
| Ex. 25 | 0.147 | 0.0420 | 0.286 | 0.0213 | 6.9 | 3.0 | 8.0 | 2.0 |
| Ex. 26 | 0.147 | 0.0428 | 0.291 | 0.0216 | 6.8 | 3.0 | 8.0 | 2.0 |

| EX. and C. Ex. | Characteristics of magnetic iron-based alloy particles | | | | | | | | |
|---|---|---|---|---|---|---|---|---|---|
| | BET sp. surface area (m²/g) | $D_{110}$ (Å) | Coercive force (Hc) | | Sat. magnetization (σ s) | | Squareness (σ r/σ s) (—) | Δ σ s (%) | Ignition temp. (° C.) |
| | | | (kA/m) | (Oe) | (Am²/kg) | (emu/g) | | | |
| Ex. 16 | 43.5 | 153 | 122.7 | 1542 | 127.6 | 127.6 | 0.503 | 4.5 | 154 |
| Ex. 17 | 43.1 | 154 | 122.5 | 1539 | 126.9 | 126.9 | 0.502 | 4.8 | 155 |
| Ex. 18 | 45.5 | 153 | 132.3 | 1663 | 126.4 | 126.4 | 0.503 | 5.8 | 148 |
| Ex. 19 | 42.9 | 157 | 123.3 | 1550 | 129.2 | 129.2 | 0.502 | 5.0 | 156 |
| Ex. 20 | 44.7 | 152 | 131.2 | 1649 | 126.1 | 126.1 | 0.502 | 5.9 | 147 |
| Ex. 21 | 42.1 | 159 | 122.5 | 1540 | 130.3 | 130.3 | 0.501 | 5.1 | 153 |
| Ex. 22 | 41.8 | 162 | 118.4 | 1488 | 133.1 | 133.1 | 0.498 | 6.3 | 137 |
| Ex. 23 | 43.6 | 145 | 118.6 | 1490 | 125.0 | 125.0 | 0.499 | 6.1 | 139 |
| Ex. 24 | 40.9 | 158 | 117.9 | 1481 | 132.6 | 132.6 | 0.498 | 6.5 | 137 |
| Ex. 25 | 43.1 | 163 | 120.3 | 1512 | 133.2 | 133.2 | 0.497 | 8.1 | 133 |
| Ex. 26 | 42.5 | 169 | 118.5 | 1489 | 136.1 | 136.1 | 0.496 | 8.3 | 130 |

TABLE 13

| | Magnetic characteristics at lower part of bed (not higher than 2 cm in bed) | | | | | | Magnetic characteristics at upper part of bed (not lower than 2 cm in bed) | | | | | |
|---|---|---|---|---|---|---|---|---|---|---|---|---|
| | Coercive force | | Sat. magnetization | | Squareness (σ r/σ s) | $D_{110}$ | Coercive force | | Sat. magnetization | | Squareness (σ r/σ s) | $D_{110}$ |
| | (kA/m) | (Oe) | (Am²/kg) | (emu/g) | (—) | (Å) | (kA/m) | (Oe) | (Am²/kg) | (emu/g) | (—) | (Å) |
| Ex. 17 | 123.3 | 1549 | 126.2 | 126.2 | 0.503 | 152 | 122.2 | 1535 | 127.1 | 127.1 | 0.501 | 155 |
| Ex. 20 | 131.9 | 1657 | 125.1 | 125.1 | 0.503 | 149 | 130.4 | 1639 | 126.5 | 126.5 | 0.501 | 153 |
| Ex. 24 | 119.6 | 1503 | 131.3 | 131.3 | 0.499 | 155 | 115.1 | 1446 | 136.3 | 136.3 | 0.495 | 165 |
| Ex. 25 | 121.6 | 1528 | 131.9 | 131.9 | 0.499 | 159 | 117.6 | 1478 | 137.5 | 137.5 | 0.494 | 171 |

| | Difference in magnetic characteristics between lower and upper parts of bed | | | | | |
|---|---|---|---|---|---|---|
| | Coercive force | | Sat. magnetization | | Squareness (σ r/σ s) | $D_{110}$ |
| | (kA/m) | (Oe) | (Am²/kg) | (emu/g) | (—) | (Å) |
| Ex. 17 | 1.1 | 14 | 0.9 | 0.9 | 0.002 | 3 |
| Ex. 20 | 1.5 | 18 | 1.4 | 1.4 | 0.002 | 4 |
| Ex. 24 | 4.5 | 57 | 5.0 | 5.0 | 0.004 | 10 |
| Ex. 25 | 4.0 | 50 | 5.6 | 5.6 | 0.005 | 12 |

TABLE 14

| | Characteristics of magnetic coating film | | | | | | | | | |
|---|---|---|---|---|---|---|---|---|---|---|
| | Orientation magnetic field 397.9 KA/m (5 KOe) | | | | | | Orientation magnetic field 238.7 KA/m (3 KOe) | | | |
| | Coercive force | | Squareness (Br/Bm) | OR | SFD | Δ Bm | Coercive force | | Squareness (Br/Bm) | OR | SFD |
| | (kA/m) | (Oe) | (—) | (—) | (—) | (%) | (kA/m) | (Oe) | (—) | (—) | (—) |
| Ex. 16 | 118.5 | 1489 | 0.876 | 3.44 | 0.467 | 3.1 | 117.1 | 1472 | 0.869 | 3.31 | 0.481 |
| Ex. 17 | 117.5 | 1476 | 0.874 | 3.42 | 0.468 | 3.4 | 116.7 | 1467 | 0.867 | 3.33 | 0.480 |
| Ex. 18 | 127.2 | 1598 | 0.875 | 3.29 | 0.474 | 4.8 | 125.9 | 1582 | 0.869 | 3.19 | 0.486 |
| Ex. 19 | 118.2 | 1485 | 0.874 | 3.46 | 0.465 | 3.3 | 117.5 | 1477 | 0.870 | 3.38 | 0.480 |
| Ex. 20 | 126.4 | 1589 | 0.873 | 3.27 | 0.475 | 4.9 | 124.9 | 1569 | 0.867 | 3.18 | 0.487 |
| Ex. 21 | 117.8 | 1480 | 0.873 | 3.41 | 0.472 | 3.5 | 116.9 | 1469 | 0.867 | 3.29 | 0.484 |
| Ex. 22 | 112.2 | 1410 | 0.849 | 3.08 | 0.518 | 5.4 | 110.0 | 1382 | 0.839 | 2.89 | 0.533 |
| Ex. 23 | 112.3 | 1411 | 0.846 | 2.97 | 0.511 | 5.2 | 110.5 | 1389 | 0.833 | 2.81 | 0.529 |
| Ex. 24 | 111.5 | 1401 | 0.842 | 2.86 | 0.531 | 5.7 | 109.8 | 1380 | 0.831 | 2.79 | 0.541 |
| Ex. 25 | 113.6 | 1427 | 0.848 | 3.05 | 0.524 | 7.1 | 111.4 | 1400 | 0.832 | 2.90 | 0.539 |
| Ex. 26 | 111.7 | 1404 | 0.841 | 2.89 | 0.536 | 7.3 | 110.2 | 1385 | 0.830 | 2.76 | 0.551 |

The spindle-shaped goethite particles and spindle-shaped hematite particles according to the present invention have a uniform particle size, are free of dendritic particles, have a suitable aspect ratio with a larger minor axis diameter and comprise particles with a difference in crystal growth in the seed crystal part and the surface layer part, and the spindle-shaped hematite particles are designed to have a specific crystallite size ratio and a specific growth ratio thereof to the crystallite size of the goethite particles, whereby the destruction of shape in both heat treatment and heat reduction steps is effectively prevented, and the spindle-shaped magnetic iron-based alloy particles obtained from the spindle-shaped goethite particles or from the spindle-shaped hematite particles as the starting material as particles having the specific ratio of Al/rare earth element have a uniform particle size, are free of dendritic particles, are excellent in dispersibility (high squareness and high orientation) even in a low magnetic field, are excellent both in weatherability and in coercive force distribution as shown in the Examples above, and are thus useful as high record density, high sensitivity and high output magnetic particles.

Further, according to the present invention, preferable reduction conditions are specifically defined, that is, the bed height is specified, the reducing gas is used during heating, and the gas superficial velocity and heating-up rate thereof are specified, whereby the reduction proceeds uniformly in the whole of the bed, and as a result, the spindle-shaped magnetic iron-based alloy particles with less difference in characteristics between upper and lower parts of the bed have a uniform particle size, are free of dendritic particles, are excellent (high squareness and high orientation) even in a low magnetic field and further excellent both in weatherability and in coercive force distribution as shown in Examples 16 to 21 above as compared with Examples 22 to 26 not satisfying these preferable conditions, and these are particularly useful as high record density, high sensitivity and high output magnetic particles.

What is claimed is:

1. Spindle-shaped goethite-particles containing not less than 0.5 and less than 8 atom % of Co based on the total Fe and 5 to 10 atom % of Al based on the total Fe and having an average major axis diameter of 0.18 to 0.30 μm, wherein a size distribution (standard deviation/major axis diameter) is not more than 0.22, an average minor axis diameter is 0.025 to 0.045 μm and an average aspect ratio is 5 to 10.

2. The spindle-shaped goethite particles according to claim 1, wherein a crystallite size ratio D020/D110 of the spindle-shaped goethite particles is 1.8 to 2.4, and a crystallite size ratio thereof to said seed crystal particles D020/D020 (seed crystal particles) is 1.05 to 1.20 and D110/D110 (seed crystal particles) is 1.02 to 1.10.

3. The spindle-shaped goethite particles according to claim 1 or 2, wherein a crystallite size D020 of the spindle-shaped goethite particles is 200 to 280 Å, and D010 is 100 to 140 Å, and a BET specific surface area is 100 to 150 m$^2$/g.

4. The spindle-shaped goethite particles according to claim 3, wherein the particles constituting the spindle-shaped goethite particles comprise a seed crystal part and a surface layer part, a weight ratio of Fe of the seed crystal part and the surface layer part is 40:60 to 50:50, Co is present in the seed crystal part and the surface crystal part, and Al is present only in the surface crystal part.

5. The spindle-shaped goethite particles according to claim 4, wherein, with 100 assigned for a presence ratio of the total Co in the whole of particles constituting the spindle-shaped goethite particles, a presence ration of Co in the seed crystal part is 75 to 95 based on the total Co and a presence ratio of Co in the surface crystal part is 103 to 125 based on the total Co.

6. The spindle-shaped goethite particles according to claim 5, wherein, with 100 assigned for a presence ratio of the total Co in the whole of particles constituting the spindle-shaped goethite particles, a presence ratio of Co in the seed crystal part is 80 to 90 based on the total Co and a presence ratio of Co in the surface crystal part is 106 to 120 based on the total Co.

7. Spindle-shaped hematite particles containing not less than 0.5 and less than 10 atom % of Co based on the total Fe, 5 to 10 atom % of Al based on the total Fe and 1 to 5 atom % of a rare earth element based on the total Fe with a ratio of Al/rare earth element of 1.5 to 5 (atom % based on the Fe) and having an average major diameter of 0.17 to 0.28 μm, wherein a size distribution (standard deviation/major axis diameter) is not more than 0.20, an average minor axis diameter is 0.022 to 0.035 μm, an average aspect ratio is 5 to 10, and a crystallite size ratio D110/D104 is 2.0 to 4.0.

8. The spindle-shaped hematite particles according to claim 7, wherein a crystallite size D104 is 100 to 150 Å, and D110 is 200 to 300 Å, and a BET specific surface area is 30 to 70 m$^2$/g.

9. The spindle-shaped hematite particles according to claim 8, wherein the BET specific surface area is 35 to 65 m$^2$/g.

10. The spindle-shaped hematite particles according to any one of claims 7 to 9, wherein the particles constituting the spindle-shaped hematite particles comprise a seed crystal part, an intermediate layer part and an outermost layer part, a weight ratio of Fe of the seed crystal part and the intermediate layer part is 40:60 to 50:50, Co is present in the seed crystal part and the intermediate layer part, and Al is present only in the intermediate layer part, and the rare earth element is present only in the outermost layer part.

11. The spindle-shaped hematite particles according to claim 10, wherein, with 100 assigned for a presence ratio of the total Co in the whole of particles constituting the spindle-shaped hematite particles, a presence ratio of Co in the seed crystal part is 75 to 95 based on the total Co and a presence ration of Co in the intermediate layer part is 103 to 125 based on the total Co.

12. The spindle-shaped hematite particles according to claim 11, wherein, with 100 assigned for a presence ration of the total Co in the whole of particles constituting the spindle-shaped goethite particles, a presence ration of Co in the seed crystal part is 80 to 90 based on the total Co and a presence ratio of Co in the intermediate layer part is 106 to 120 based on the total Co.

13. Spindle-shaped magnetic iron-based alloy particles containing not less than 0.5 and less than 10 atom % of Co based on the total Fe, 5 to 10 atom % of Al based on the total Fe and 1 to 5 atom % of a rare earth element based on the total Fe with a ratio of Al/rare earth element of 1.5 to 5 (atom % based on the Fe) and having an average major axis diameter of 0.15 to 0.25 μm, wherein a size distribution (standard deviation/major axis diameter) is not more than 0.30, an average minor axis diameter is 0.015 to 0.025 μm, an average aspect ratio is 5 to 9, an ignition temperature is not lower than 135° C., an oxidation stability is not more than 10%, and a coercive force is 103.5 to 143.2 KA/m (1300 to 1800 Oe).

14. The spindle-shaped magnetic iron-based alloy particles according to claim 13, wherein the particles constituting the spindle-shaped magnetic iron-based alloy particles have a saturation magnetization (σs) of 110 to 160 Am$^2$/Kg (110 to 160 emu/g) and a BET specific surface area of 30 to 60 m$^2$/g, and a crystallite size of 130 to 180 Å.

15. The spindle-shaped magnetic iron-based alloy particles according to claim 14, wherein the particles constituting the spindle-shaped magnetic iron-based alloy particles have an ignition temperature of not lower than 140° C., an oxidation stability of not more than 8%, a coercive force of 107.4 to 139.3 KA/m (1350 to 1750 Oe), a BET specific surface area of 35 to 55 m$^2$/g and a crystallite size of 140 to 170 Å.

16. Spindle-shaped magnetic iron-based alloy particles containing not less than 0.5 and less than 10 atom % of Co based on the total Fe, 5 to 10 atom % of Al based on the total Fe and 1 to 5 atom % of a rare earth element based on the total Fe with a ratio of Al/rare earth element of 1.5 to 5 (atom % based on the Fe) and having an average major axis diameter of 0.15 to 0.25 μm, wherein a size distribution (standard deviation/major axis diameter) is not more than 0.26, an average minor axis diameter is 0.015 to 0.025 μm, an average aspect ratio is 5 to 9, an ignition temperature is not lower than 145° C., an oxidation stability is not more than 6%, and a coercive force is 103.5 to 143.2 KA/m (1300 to 1800 Oe).

17. The spindle-shaped magnetic iron-based alloy particles according to claim 16, wherein the particles constituting the spindle-shaped magnetic iron-based alloy particles have a saturation magnetization (σs) of 110 to 160 Am$^2$/Kg (110 to 160 emu/g), a BET specific surface area of 30 to 60 m$^2$/g, a crystallite size D110 of 130 to 180 Å and a squareness (σr/σs) of not less than 0.50.

18. The spindle-shaped magnetic iron-based alloy particles according to claim 17, wherein the particles constituting the spindle-shaped magnetic iron-based alloy particles have a coercive force of 107.4 to 139.3 KA/m (1350 to 1750 Oe), a BET specific surface area of 35 to 55 m$^2$/g and a crystallite size of 140 to 170 Å.

19. A process for producing spindle-shaped goethite particles, which comprises the steps of:

aging an aqueous suspension containing ferrous iron-containing precipitates obtained by reacting an aqueous alkali mixture comprising of an alkali carbonate aqueous solution and an alkali hydroxide aqueous solution with a ferrous salt aqueous solution in a nonoxidizing atmosphere, passing an oxygen-containing gas through the aqueous suspension to form spindle-shaped goethite seed crystal particles by oxidation reaction, passing an oxygen-containing gas through the aqueous suspension containing the seed crystal particles and the ferrous iron-containing precipitates to allow a goethite layer to grow by oxidation reaction on the surface of the seed crystal particles to form spindle-shaped goethite particles, an improvement of which comprises adding a Co compound containing not less than 0.5 and less than 8 atom % of Co based on the total Fe, at a stage within ½ of the total aging time, to the aqueous suspension of aging ferrous iron-containing precipitates before initiation of oxidation reaction, conducting oxidation reaction within the range of 40 to 50% of the total $Fe^{2+}$, and adding an Al compound containing 5 to 10 atom % of Al based on the total Fe.

20. A process for producing spindle-shaped hematite particles, which comprises the steps of:

treating the spindle-shaped goethite particles described in claim 1 with a sintering preventing agent comprising a compound of rare earth elements containing 1 to 5 atom % of a rare earth element based on the total Fe such that the ratio of Al/rare earth element is 1.5 to 5 (atom % based on Fe), and heat treating the treated spindle-shaped goethite particles at 650 to 800° C. in a non-reducing atmosphere such that the crystallite size D104 is in the range of 0.9 to 1.1 as D104/goethite D110.

21. A process for producing spindle-shaped magnetic iron-based alloy particles, which comprises heat reducing the spindle-shaped hematite particles described in claim 7 at 400 to 700° C. in a reducing atmosphere.

22. The process for producing spindle-shaped magnetic iron-based alloy particles according to claim 21, which comprises introducing the spindle-shaped hematite particles into a reduction apparatus to form a fixed bed of 3 to 15 cm in height and heating the spindle-shaped hematite particles at 400 to 700° C. at a heating-up rate of 10 to 80° C./min. in a reducing atmosphere at a superficial velocity of 40 to 150 cm/s to reduce the spindle-shaped hematite particles.

23. The process for producing spindle-shaped magnetic iron-based alloy particles according to claim 22, which comprises introducing the spindle-shaped hematite particles described into a reduction apparatus to form a fixed bed of 4 to 14 cm in height and heating the spindle-shaped hematite particles at 400 to 650° C. at a heating-up rate of 20 to 70° C./min. in a reducing atmosphere at a superficial velocity of 40 to 140 cm/s to reduce the spindle-shaped hematite particles.

24. The process for producing spindle-shaped magnetic iron-based alloy particles according to claim 22 or 23, wherein a difference in magnetic characteristics between upper and lower parts of the bed of the spindle-shaped magnetic iron-based alloy particles is not more than 3.2 KA/m (40 Oe) in coercive force, not more than 4 $Am^2$/Kg (4 emu/g) in saturation magnetization, not more than 0.003 in squareness ($\sigma r/\sigma s$) and not more than 8 Å in crystallite size D110.

25. The process for producing spindle-shaped magnetic iron-based alloy particles according to claim 24, wherein a difference in magnetic characteristics between upper and lower parts of the bed of the spindle-shaped magnetic iron-based alloy particles is not more than 2.4 KA/m (30 Oe) in coercive force, not more than 3 $Am^2$/Kg (3 emu/g) in saturation magnetization, not more than 0.002 in squareness ($\sigma r/\sigma s$) and not more than 6 Å in crystallite size D110.

* * * * *